United States Patent
Mathies et al.

(10) Patent No.: US 7,766,033 B2
(45) Date of Patent: Aug. 3, 2010

(54) MULTIPLEXED LATCHING VALVES FOR MICROFLUIDIC DEVICES AND PROCESSORS

(75) Inventors: Richard A. Mathies, Moraga, CA (US); William H. Grover, Medford, MA (US); Erik C. Jensen, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 523 days.

(21) Appl. No.: 11/726,701

(22) Filed: Mar. 21, 2007

(65) Prior Publication Data

US 2007/0237686 A1    Oct. 11, 2007

Related U.S. Application Data

(60) Provisional application No. 60/785,005, filed on Mar. 22, 2006.

(51) Int. Cl.
*F16K 31/128* (2006.01)
(52) U.S. Cl. .................... 137/297; 251/26; 422/103
(58) Field of Classification Search ............... 137/597, 137/907; 422/103; 251/26, 29
See application file for complete search history.

(56) References Cited

U.S. PATENT DOCUMENTS

| | | | |
|---|---|---|---|
| 3,352,643 A | 11/1967 | Ando et al. | |
| 3,433,257 A | 3/1969 | Jensen | |
| 3,568,692 A | 3/1971 | Metzger et al. | |
| 3,610,274 A * | 10/1971 | Levesque et al. | 137/519 |
| 5,376,252 A | 12/1994 | Ekström et al. | |
| 5,453,163 A | 9/1995 | Chco | |
| 5,571,410 A | 11/1996 | Swedberg et al. | |
| 5,587,128 A | 12/1996 | Wilding et al. | |
| 5,705,813 A | 1/1998 | Apffel et al. | |
| 5,741,462 A | 4/1998 | Nova et al. | |
| 5,750,015 A | 5/1998 | Soane et al. | |
| 5,770,029 A | 6/1998 | Nelson et al. | |
| 5,775,371 A | 7/1998 | Pan et al. | |
| 5,856,174 A | 1/1999 | Lipshutz et al. | |
| 5,863,502 A | 1/1999 | Southgate et al. | |
| 5,908,552 A | 6/1999 | Zimmerman et al. | |
| 5,922,591 A | 7/1999 | Anderson et al. | |
| 5,942,443 A | 8/1999 | Parce et al. | |
| 5,971,158 A | 10/1999 | Yager et al. | |

(Continued)

FOREIGN PATENT DOCUMENTS

EP    0459241 B1    12/1991

(Continued)

OTHER PUBLICATIONS

W.H. Grover, et al., Monolithic membrane valves and diaphragm pumps for practical large-scale integration into glass microfluidic devices, *Sensors and Actuators B*, 89: pp. 315-323, 2003.

(Continued)

*Primary Examiner*—Stephen Hepperle
(74) *Attorney, Agent, or Firm*—Weaver Austin Villeneuve & Sampson LLP

(57) ABSTRACT

Membrane valves and latching valve structures for microfluidic devices are provided. A demultiplexer can be used to address the latching valve structures. The membrane valves and latching valve structures may be used to form pneumatic logic circuits, including processors.

21 Claims, 17 Drawing Sheets

U.S. PATENT DOCUMENTS

| | | |
|---|---|---|
| 6,001,229 A | 12/1999 | Ramsey |
| 6,007,690 A | 12/1999 | Nelson et al. |
| 6,007,775 A | 12/1999 | Yager |
| 6,010,607 A | 1/2000 | Ramsey |
| 6,048,100 A | 4/2000 | Thrall et al. |
| 6,073,482 A | 6/2000 | Moles |
| 6,103,199 A | 8/2000 | Bjornson et al. |
| 6,120,184 A | 9/2000 | Laurence et al. |
| 6,136,212 A | 10/2000 | Mastrangelo et al. |
| 6,168,948 B1 | 1/2001 | Anderson et al. |
| 6,176,962 B1 | 1/2001 | Soane et al. |
| 6,190,616 B1 | 2/2001 | Jovanovich et al. |
| 6,207,031 B1 | 3/2001 | Adourian et al. |
| 6,235,471 B1 | 5/2001 | Knapp et al. |
| 6,280,589 B1 | 8/2001 | Manz et al. |
| 6,319,476 B1 | 11/2001 | Victor, Jr. et al. |
| 6,322,683 B1 | 11/2001 | Wolk et al. |
| 6,379,929 B1 | 4/2002 | Burns et al. |
| 6,403,338 B1 | 6/2002 | Knapp et al. |
| 6,408,878 B2 | 6/2002 | Unger et al. |
| 6,423,536 B1 | 7/2002 | Jovanovich et al. |
| 6,432,290 B1 | 8/2002 | Harrison et al. |
| 6,454,924 B2 | 9/2002 | Jedrzejewski et al. |
| 6,489,112 B1 | 12/2002 | Hadd et al. |
| 6,521,188 B1 | 2/2003 | Webster |
| 6,524,456 B1 | 2/2003 | Ramsey et al. |
| 6,532,997 B1 | 3/2003 | Bedingham et al. |
| 6,533,914 B1 | 3/2003 | Liu |
| 6,537,757 B1 | 3/2003 | Langmore et al. |
| 6,544,734 B1 | 4/2003 | Briscoe et al. |
| 6,551,839 B2 | 4/2003 | Jovanovich et al. |
| 6,581,441 B1 | 6/2003 | Paul |
| 6,605,454 B2 | 8/2003 | Barenburg et al. |
| 6,613,525 B2 | 9/2003 | Nelson et al. |
| 6,614,228 B2 | 9/2003 | Hofmann et al. |
| 6,618,679 B2 | 9/2003 | Loehrlein |
| 6,623,613 B1 | 9/2003 | Mathies et al. |
| 6,627,446 B1 | 9/2003 | Roach et al. |
| 6,629,820 B2 | 10/2003 | Kornelsen |
| 6,632,619 B1 | 10/2003 | Harrison et al. |
| 6,632,655 B1 | 10/2003 | Mehta et al. |
| 6,663,833 B1 | 12/2003 | Stave et al. |
| D486,156 S | 2/2004 | Lee et al. |
| 6,685,442 B2 | 2/2004 | Chinn et al. |
| D488,818 S | 4/2004 | Lee et al. |
| 6,752,922 B2 | 6/2004 | Huang et al. |
| 6,764,648 B1 | 7/2004 | Roach et al. |
| 6,782,746 B1 | 8/2004 | Hasselbrink et al. |
| 6,786,708 B2 | 9/2004 | Brown et al. |
| 6,787,111 B2 | 9/2004 | Roach et al. |
| 6,793,753 B2 | 9/2004 | Unger et al. |
| 6,802,342 B2 | 10/2004 | Fernandes et al. |
| 6,803,019 B1 | 10/2004 | Bjornson et al. |
| 6,824,663 B1 | 11/2004 | Boone |
| 6,829,753 B2 | 12/2004 | Lee et al. |
| 6,852,287 B2 | 2/2005 | Ganesan |
| 6,870,185 B2 | 3/2005 | Roach et al. |
| 6,885,982 B2 | 4/2005 | Harris et al. |
| 6,899,137 B2 | 5/2005 | Unger et al. |
| 6,923,907 B2 | 8/2005 | Hobbs et al. |
| 6,929,030 B2 | 8/2005 | Unger et al. |
| 6,951,632 B2 | 10/2005 | Unger et al. |
| 6,953,058 B2 | 10/2005 | Fernandes et al. |
| 6,960,437 B2 | 11/2005 | Enzelberger et al. |
| 7,005,493 B2 | 2/2006 | Huang et al. |
| 7,015,030 B1 | 3/2006 | Fouillet et al. |
| 7,198,759 B2 | 4/2007 | Bryning et al. |
| 7,312,611 B1 | 12/2007 | Harrison et al. |
| 7,323,305 B2 | 1/2008 | Leamon et al. |
| 7,438,856 B2 | 10/2008 | Jedrzejewski et al. |
| 7,445,926 B2 | 11/2008 | Mathies et al. |
| 7,488,603 B2 | 2/2009 | Gjerde et al. |
| 2002/0022587 A1 | 2/2002 | Ferguson et al. |
| 2002/0047003 A1 | 4/2002 | Bedingham et al. |
| 2002/0048536 A1 | 4/2002 | Bergh et al. |
| 2002/0051992 A1 | 5/2002 | Bridgham et al. |
| 2002/0058332 A1 | 5/2002 | Quake et al. |
| 2002/0098097 A1 | 7/2002 | Singh |
| 2002/0110900 A1 | 8/2002 | Jovanovich et al. |
| 2002/0119480 A1 | 8/2002 | Weir et al. |
| 2002/0119482 A1 | 8/2002 | Nelson et al. |
| 2003/0021734 A1 | 1/2003 | Vann et al. |
| 2003/0217923 A1 | 11/2003 | Harrison et al. |
| 2004/0014091 A1 | 1/2004 | Duck et al. |
| 2004/0037739 A1 | 2/2004 | Mcneely et al. |
| 2004/0053290 A1 | 3/2004 | Terbrueggen et al. |
| 2004/0063217 A1 | 4/2004 | Webster et al. |
| 2004/0072278 A1 | 4/2004 | Chou et al. |
| 2004/0086872 A1 | 5/2004 | Childers et al. |
| 2004/0132170 A1 | 7/2004 | Storek et al. |
| 2004/0151629 A1 | 8/2004 | Pease et al. |
| 2004/0197845 A1 | 10/2004 | Hassibi et al. |
| 2004/0209354 A1 | 10/2004 | Mathies et al. |
| 2004/0224380 A1 | 11/2004 | Chou et al. |
| 2005/0047967 A1 | 3/2005 | Chuang et al. |
| 2005/0053952 A1 | 3/2005 | Hong et al. |
| 2005/0161326 A1 | 7/2005 | Morita et al. |
| 2005/0224134 A1 | 10/2005 | Yin et al. |
| 2005/0224352 A1 | 10/2005 | Harrison et al. |
| 2005/0255003 A1 | 11/2005 | Summersgill et al. |
| 2005/0287572 A1 | 12/2005 | Mathies et al. |
| 2006/0027456 A1 | 2/2006 | Harrison et al. |
| 2006/0057209 A1 | 3/2006 | Chapman et al. |
| 2006/0073484 A1 | 4/2006 | Mathies et al. |
| 2006/0076068 A1 | 4/2006 | Young et al. |
| 2006/0163143 A1 | 7/2006 | Chirica et al. |
| 2006/0186043 A1 | 8/2006 | Covey et al. |
| 2006/0266645 A1 | 11/2006 | Chen et al. |
| 2007/0017812 A1 | 1/2007 | Bousse |
| 2007/0175756 A1 | 8/2007 | Nguyen et al. |
| 2007/0237686 A1 | 10/2007 | Mathies et al. |
| 2007/0248958 A1 | 10/2007 | Jovanovich et al. |
| 2007/0297947 A1 | 12/2007 | Sommers et al. |
| 2008/0014576 A1 | 1/2008 | Jovanovich et al. |
| 2008/0237146 A1 | 10/2008 | Harrison et al. |
| 2009/0035770 A1 | 2/2009 | Mathies et al. |
| 2009/0060797 A1 | 3/2009 | Mathies et al. |
| 2009/0084679 A1 | 4/2009 | Harrison et al. |

FOREIGN PATENT DOCUMENTS

| | | |
|---|---|---|
| EP | 0527905 B1 | 11/1995 |
| EP | 1065378 B1 | 4/2002 |
| JP | 408327594 A | 12/1996 |
| WO | WO 96/04547 A1 | 2/1996 |
| WO | WO 98/52691 A1 | 11/1998 |
| WO | WO 99/36766 A1 | 7/1999 |
| WO | WO 99/40174 A1 | 8/1999 |
| WO | WO 00/40712 A1 | 7/2000 |
| WO | WO 00/60362 A1 | 10/2000 |
| WO | WO 01/38865 A1 | 5/2001 |
| WO | WO 01/85341 A1 | 11/2001 |
| WO | WO 02/043615 A2 | 6/2002 |
| WO | WO 02/043615 A3 | 3/2003 |
| WO | WO 2004/098757 A2 | 11/2004 |
| WO | WO 2005/075081 A1 | 8/2005 |
| WO | WO 2004/098757 A3 | 5/2006 |

OTHER PUBLICATIONS

Hidekuni Takao et al., A Pneumatically Actuated Full In-Channel Microvalve With MOSFET-Like Function in Fluid Channel Networks, *Journal of Microelectromechanical Systems*, vol, 11, No. 5, Oct. 2002, pp. 421-426.

Hidekuni Takao et al., Microfluidic Integrated Circuits for Signal Processing Using Analogous Relationship Betweeen Pneumatic Microvalve and MOSFET, *Journal of Microelectromechanical Systems*, vol. 12, No. 4, Aug. 2003, pp. 497-505.

D. Jed Harrison et al., Micromachining a Miniaturized Capillary Electrophoresis-Based Chemical Analysis System on a Chip, *Science*, vol. 261, Aug. 13, 1993, pp. 895-897.

Charles A. Emrich et al., Microfabricated 384-Lane Capillary Array Electrophoresis Bioanalyzer for Ultrahigh-Throughput Genetic Analysis, *Analytical Chemistry*, vol. 74, No. 19, Oct. 1, 2002, pp. 5076-5083.

E.T. Lagally et al., Integrated Portable Genetic Analysis Microsystem for Pathogen/Infectious Disease Detection, *Analytical Chemistry*, vol. 76, No. 11, Jun. 1, 2004, pp. 3162-3170.

Brian M. Paegel et al., Microfludic Devices for DNA Sequencing: Sample Preparation and Electrophoretic Analysis, *Current Opinion in Biotechnology*, 14, pp. 42-50, 2003.

William H. Grover et al., Monolithic Membrane Valves and Diaphragm Pumps for Practical Large-Scale Integration Into Glass Microfludic Devices, *Sensors and Actuators B*, 89: pp. 315-323, 2003.

C. Goll et al., Microvalves With Bistable Buckled Polymer Diaphragms, *J. Micromech. Microeng.*, 6, pp. 77-79. 1996.

W.K. Schomburg et al., Design Optimization of Bistable Microdiaphragm Valves, *Sensors and Actuators A*, 64: pp. 259-264, 1998.

T. Lisec et al., A Bistable Pneumatic Microswitch for Driving Fluidic Components, *Sensors and Actuators A*, 54: pp. 746-749, 1996.

Mircea Capanu et al., Design Fabrication, and Testing of a Bistable Electromagnetically Actuated Microvalve, *Journal of Microelectromechanical Systems*, vol. 9 No. 2, pp. 181-189, Jun. 2000.

Todd Thorsen et al., Microfluidic Large-Scale Integration, *Science*, vol. 298, Oct. 18, 2002, pp. 580-584.

Marc A. Unger et al., Monolithic Microfabricated Valves and Pumps by Multilayer Soft Lithography, *Science*, vol. 288, Apr. 7, 2000, pp. 113-116.

William H. Press et al., The Art of Scientific Computing, *Numerical Recipes in C*, 2nd Edition, Cambridge University Press, 1992 (Table of Contents).

Charles H. Roth, Jr., *Fundamentals of Logic Design*, 31rd Edition, West Publishing Company, 1985 (Table of Contents).

William H. Grover et al., An Integrated Microfluidic Processor for Single Nucleotide Polymorphism-based DNA Computing, *Lab on a Chip*, vol. 5, No. 10, Oct. 2005, pp. 1033-1040.

International Search Report and Written Opinion of the International Searching Authority dated Jul. 15, 2008, for corresponding PCT Application No. PCT/US07/07381.

Amendment and Request for Correction of Inventorship mailed Jan. 10, 2008 in U.S. Appl. No. 10/750,533.

Anderson, et al. A miniature integrated device for automated multistep genetic assays. Nucleic Acids Research. 2000;28:e60.

Bings, et al. Microfluidic Devices Connected to Fused-Silica Capillaries with Minimal Dead Dead Volume. Analytical Chemistry. 1999;71(15):3292-3296.

Blazej, et al. Microfabricated bioprocessor for integrated nanoliter-scale Sanger DNA sequencing. Proc. Natl. Acad. Sci. USA 2006;103:7240-7245.

Blazej, et al. Polymorphism Ratio Sequencing: A New Approach for Single Nucleotide Polymorphism Discovery and Genotyping. Genome Research. 2003;13:287-293.

Brenner, et al. Gene expression analysis by massively parallel signature sequencing (MPSS) on microbead arrays. Nature Biotechnology. 2000;18(6):630-634.

Buchholz, et al. The use of light scattering for precise characterization of polymers for DNA sequencing by capillary electrophoresis. Electrophoresis. 2001;22:4118-4128.

Caplus abstract of Krohkin et al. Modified silica as a stationary phase for ion chromatography. Journal of Chromatography A. 1995;706:93-8.

Chan, et al. Microfabricated Polymer Devices for Automated Sample Delivery of Peptides for Analysis by Electrospray Ionization Tandem Mass Spectrometry. Analytical Chemistry. 1999;71(20):4437-4444.

Chiem, et al. Microchip systems for immunoassay: an integrated immunoreactor with electrophoretic separation for serum theophylline determination. Clinical Chemistry.1998;44(3):591-598.

Chiem, et al. Room temperature bonding of micromachined glass devices for capillary electrophoresis. Sensors and Actuators. 2000;B63(3):147-152.

Coleman, et al. A sequential injection microfluidic mixing strategy. Microfluidics and Nanofluidics. 2005;319-327.

Curcio, et al. Continuous Segmented-Flow Polymerase Chain Reaction for High-Throughput Miniaturized DNA Amplification. Analytical Chemistry. 2003;75(1):1-7.

Diehl, et al. BEAMing: single-molecule PCR on microparticles in water-in-oil emulsions. Nature Methods. 2006;3(7):551-9.

Doherty, et al. Sparsely Cross-linked "Nanogel" Matrices as Fluid, Mechanically Stablized Polymer Networks for High-Throughput Microchannel DNA Sequencing. Analytical Chemistry. 2004;76:5249-5256.

Doherty, et al. Sparsely cross-linked "nanogels" for microchannel DNA sequencing. Electrophoresis. 2003;24(24):4170-4180.

Dorfman, et al. Contamination-Free Continuous Flow Microfluidic Polymerase Chain Reaction for Quantitative and Clinical Applications. Analytical Chemistry. 2005;77(11):3700- 3704.

Doyle, et al. Self-Assembled Magnetic Matrices for DNA Separation Chips. Science. 2000;295:2237.

Dressman, et al. Transforming single DNA molecules into fluorescent magnetic particles for detection and enumeration of genetic variations. Proc Natl Acad Sci USA. 2003;100(15):8817-8822.

Ericson, et al. Electroosmosis- and Pressure-Driven Chromatography in Chips Using Continuous Beds. Analytical Chemistry. 2000;72(1):81-87.

Ewing, et al. Base-Calling of Automated Sequencer Traces Using Phred. I. Accuracy Assessment. Genome Research. 1998;8:175-185.

Ewing, et al. Base-Calling of Automated Sequencer Traces Using Phred. II. Error probabilities. Genome Research. 1998;8:186-194.

Figeys, et al. A Microfabricated Device for Rapid Protein Identification by Microelectrospray Ion Trap Mass Spectrometry. Analytical Chemistry. 1997;69(16):3153-3160.

Figeys, et al. An Integrated Microfluidics-Tandem Mass Spectrometry System for Automated Protein Analysis. Analytical Chemistry. 1998;70(18):3728-3734.

Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications in Mass Spectrometry. 1998;12:1435-1444.

Figeys, et al. Nanoflow Solvent Gradient Delivery from a Microfabricated Device for Protein Identifications by Electrospray Ionization Mass Spectrometry. Analytical Chemistry. 1998;70(18):3721-3727.

Francis, et al. Flow analysis based on a pulsed flow of solution: theory, instrumentation and applications. Talanta. 2002;58(6):1029-1042.

Ghadessy, et al. Directed evolution of polymerase function by compartmentalized self-replication. Proc Natl Acad Sci USA. 2001;98:4552-4557.

Giddings, et al. A software system for data analysis in automated DNA sequencing. Genome Research. 1998;8:644-665.

Grover, et al. Practical Valves and Pumps for Large-Scale Integration into Microfludic Analysis Devices. Micro Total Analysis Systems. 2002;1:136-138.

Hansen, et al. A robust and scalable microfluidic metering method that allows protein crystal growth by free interface diffusion. Proc Natl Acad Sci USA. 2002;99(26):16531-16536.

Hayes, et al. Edge: A Centralized Resource for the Comparison, Analysis, and Distribution of Toxicogenomic Information. Molecular Pharmacology. 2005;67(4):1360-1368.

International Preliminary Report for corresponding PCT Application No. PCT/CA2000/01421 dated Feb. 14, 2002.

International Preliminary Report for corresponding PCT Application No. PCT/US2005/018678 dated Nov. 13, 2007.

International Preliminary Report for corresponding PCT Application No. PCT/US2005/033347 dated Mar. 20, 2007.

International Preliminary Report for corresponding PCT Application No. PCT/US2007/007381 dated Sep. 23, 2008.

International Preliminary Report for corresponding PCT Application No. PCT/US2007/02721 dated Aug. 5, 2008.

International Preliminary Report for corresponding PCT Application No. PCT/US2007/061573 dated Aug. 26, 2008.

International Search Report for PCT/US2005/033347.

Ju, et al. Fluorescence energy transfer dye-labeled primers for DNA sequencing and analysis. Proc. Natl. Acad. Sci. USA. 1995;92:4347-4351.

Kan, et al. A novel thermogelling matrix for microchannel DNA sequencing based on poly-N-alkoxyalkylaclylamide copolymers. Electrophoresis. 2003;24(24):4161-4169.

Koh, et al. Integrating Polymerase Chain Reaction, Valving, and Electrophoresis in a Plastic Device for Bacterial Detection. Analytical Chemistry. 2003;75(17):4591-4598.

Kopp, et al. Chemical Amplification Continuous-Flow PCR on a Chip. Science. 1998;280:1046-1048.

Lagally, et al. Fully integrated PCR-capillary electrophoresis microsystem for DNA analysis. Lab on a Chip. 2001;1(2):102-107.

Lagally, et al. Monolithic integrated microfluidic DNA amplification and capillary electrophoresis analysis system. Sensors and Actuators. 2000;B63(3):138-146.

Lagally, et al. Single-Molecule DNA Amplification and Analysis in an Integrated Microfluidic Device. Analytical Chemistry. 2001;73(3): 565-570.

Lazar, et al. Subattomole-Sensitivity Microchip Nanoelectrospray Source with Time-of-Flight Mass Spectrometry Detection. Analytical Chemistry. 1999;71(17):3627-3631.

Li, et al. Integration of Microfabricated Devices to Capillary Electrophoresis-Electrospray Mass Spectrometry Using a Low Dead Volume Connection: Application to Rapid Analyses of Proteolytic Digests. Analytical Chemistry. 1999;71(15):3036-3045.

Li, et al. Rapid and sensitive separation of trace level protein digests using microfabricated devices coupled to a quadrupole—time-of-flight mass spectrometer. Electrophoresis. 2000;21:198-210.

Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.

Licklider, et al. A Micromachined Chip-Based Electrospray Source for Mass Spectrometry. Analytical Chemistry. 2000;72(2):367-375.

Liu, et al. Automated parallel DNA sequencing on multiple channel microchips. Proc. Natl. Acad. Sci. USA. 2000;97(10):5369-5374.

Liu, et al. Optimization of High-Speed DNA Sequencing on Microfabricated Capillary Electrophoresis Channels. Analytical Chemistry. 1999;71:566-573.

Margulies, et al. Genome sequencing in microfabricated high-density picolitre reactors. Nature. 2005;437(7057):376-80. (Abstact only).

Melin, et al. A Passive 2-Dimensional Liquid Sample Micromixer. 7th International Conference on Miniaturized Chemical and Biochemical Analysis Systems. 2003;167-170.

Mitra, et al. Digital genotyping and haplotyping with polymerase colonies. Proc Natl Acad Sci USA. 2003.100(10):15926-5931.

Obeid, et al. Microfabricated Device for DNA and RNA Amplification by Continuous-Flow Polymerase Chain Reaction and Reverse Transcription-Polymerase Chain Reaction with Cycle Number Selection. Analytical Chemistry. 2003;75(2): 288-295.

Ocvirk, et al. High Performance Liquid Chromatography Partially Integrated onto a Silicon Chip. Analytical Methods and Instrumentation. 1995;2:74-82.

Ocvirk, et al. Optimization of confocal epifluorescence microscopy for microchip-based miniaturized total analysis systems. The Analyst. 1998;123:1429-1434.

Office Action Final dated Feb. 19, 2008 issued in U.S. Appl. No. 10/540,658.

Office Action Final dated Feb. 6, 2008 issued in U.S. Appl. No. 11/139,018.

Office Action mailed Apr. 27, 2007 in U.S. Appl. No. 11/139,018.

Office Action mailed Jul. 2, 2007 in U.S. Appl. No. 10/540,658.

Office Action mailed Jul. 12, 2007 in U.S. Appln. No. 10/750,533.

Ohori, et al. Partly disposable three-way mirovalve for a medical micro total analysis system (muTAS). Sensors and Actuators. 1998;A64(1): 57-62.

Oleschuk, et al. Trapping of Bead-Based Reagents within Microfluidic Systems: On-Chip Solid-Phase Extraction and Electrochromatography. Analytical Chemistry. 2000;72:585-590.

Olsen, et al. Immobilization of DNA Hydrogel Plugs in Microfluidic Channels. Analytical Chemistry. 2002;74:1436-1441.

Paegel, et al. High-throughput DNA sequencing with a 96-lane capillary array electrophoresis bioprocessor. Proc Natl Acad Sci USA. 2002;99:574-579.

Paegel, et al. Microchip Bioprocessor for Integrated Nanovolume Sample Purification and DNA Sequencing. Analytical Chemistry. 2002;74(19):5092-5098.

Paegel, et al. Turn Geometry for Minimizing Band Broadening in Microfabricated Capillary Electrophoresis Channels. Analytical Chemistry. 2000;72:3030-3037.

PCT Notification of Transmittal of the International Search Report and the Written Opinion of the International Searching Authority, or the Declaration, mailed Jun. 17, 2008, Application No. PCT/US2007/082568.

Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.

Ramsey, et al. Generating Electrospray from Microchip Devices Using Electroosmotic Pumping. Analytical Chemistry. 1997;69(6):1174-1178.

Rohr, et al. Porous polymer monoliths: Simple and efficient mixers prepared by direct polymerization in the channels of microfluidic chips. Electrophoresis. 2001;22:3959-3967.

Rye, et al. High-sensitivity two-color detection of double-stranded DNA with a confocal fluorescence gel scanner using ethidium homodimer and thiazole orange. Nucleic Acids Research. 1991;19(2):327-333.

Scherer, et al. High-Pressure Gel Loader for Capillary Array Electrophoresis Microchannel Plates. Biotechniques. 2001;31(5):1150-1154.

Seifar, et al. Capillary electrochromatography with 1.8-mum ODS-modified porous silica particles. Journal of Chromatography. 1998; A808:71-77.

Simpson, et al. High-throughput genetic analysis using microfabricated 96-sample capillary array electrophoresis microplates. Proc Natl Acad Sci USA. 1998;95:2256-2261.

Simpson, et al. Microfabrication Technology for the Production of Capillary Array Electrophoresis Chips. Biomedical Microdevices. 1998;1:7-26.

Soper, et al. Sanger DNA Sequencing Reactions Performed in a Solid-Phase Nanoreactor Directly Coupled to Capillary Gel Electrophoresis. Analytical Chemistry. 1998;70:4036-4043.

Spiering, et al. Novel microstructures and technologies applied in chemical analysis techniques. 1997 International Conference on Solid-State Sensors and Actuators. 1997;1:511-514.

Takao, et al. A Pneumatically Actuated Full In-Channel Microvalve With MOSFET-Like Function in Fluid Channel Networks. Journal of Microelectromechanical Systems. 2002;11(5):421-426.

Takao, et al. Microfluidic Integrated Circuits for Signal Processing Using Analogous Relationship Betweeen Pneumatic Microvalve and MOSFET. Journal of Microelectromechanical Systems. 2003;12(4):497-505.

Thomas, et al. Application of Genomics to Toxicology Research. Environmental Health Perspectives. 2002;110(6):919-923.

Tice, et al. Formation of Droplets and Mixing in Multiphase Microfluidics at Low Values of the Reynolds and the Capillary Numbers. Langmuir. 2003;19:9127-9133.

Van Der Moolen, et al. A Micromachined Injection Device for CZE: Application to Correlation CZE. Analytical Chemistry. 1997;69(20):4220-4225.

Van Der Moolen, et al. Correlation Capillary Zone Electrophoresis, a Novel Technique to Decrease Detection Limits. Chromatographia. 1995;40(7/8):368-374.

Vazquez, et al. Electrophoretic Injection within Microdevices. Analytical Chemistry. 2002;74:1952-1961.

Veenstra, et al. The design of an in-plane compliance structure for microfluidical systems. Sensors and Actuators. 2002;B81:377-383.

Waller, et al. Quantitative Immunocapture PCR Assay for Detection of Campylobacter jejuni in Foods. Applied Environmental Microbiology. 2000.

Weimer, et al. Solid-Phase Capture of Proteins, Spores, and Bacteria. Applied Environmental Microbiology. 2001;67(3):1300-1307.

Wen, et al. Microfabricated isoelectric focusing device for direct electrospray ionization-mass spectrometry. Electrophoresis. 2000;21:191-197.

Wikipedia brochure for defining stocahstic process. Sep. 2, 2009.

Williams, et al. Amplification of complex gene libraries by emulsion PCR. Nature Methods. 2006;3(7):545-50.

Woolley, et al. Functional Integration of PCR Amplification and Capillary Electrophoresis in a Microfabricated DNA Analysis Device. Analytical Chemistry. 1996;68(23):4081-4086.

Wright, et al. Behavior and Use of Nonaqueous Media without Supporting Electrolyte in Capillary Electrophoresis and Capillary Electrochromatography. Analytical Chemistry. 1997;69(16):3251-3259.

Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.

Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.

Xue, et al. Multichannel Microchip Electrospray Mass Spectrometry. Analytical Chemistry. 1997;69(3):426-430.

Yang, et al. A MEMS thermopneumatic silicone rubber membrane valve. Sensors and Actuators. 1998;A64(1):101-108.

Yu, et al. Preparation of Monolithic Polymers with Controlled Porous Properties for Microfluidic Chip Applications Using Photoinitiated Free Radial Polymerization. Journal of Polymer Science. 2002;40:755-769.

Yu, et al. Towards stationary phases for chromatography on a microchip: Molded porous polymer monoliths prepared in capillaries by photoinitiated in situ polymerization as separation media for electrochromatography. Electrophoresis. 2000;21:120-127.

Zhang, et al. A Microdevice with Integrated Liquid Junction for Facile Peptide and Protein Analysis by Capillary Electrophoresis/Electrospray Mass Spectrometry. Analytical Chemistry. 2000;72(5):1015-1022.

Zhang, et al. Microfabricated Devices for Capillary Electrophoresis-Electrospray Mass Spectrometry. Analytical Chemistry. 1999;71(15):3258-3264.

Chinese Office Action dated Jan. 25, 2008, from Application No. 2003801100666.

Hultman, T.S., et al. Bidirectional Solid-Phase Sequenceing of in Vitro-Amplified Plasmid DNA. Bio Techniques, 1991. 10:p. 84-93.

Nakano, H., et al., "Single-Step Single-Molecule PCR of DNA with a Homo-Priming Sequence Using a Single Primer and Hot-Startable DNA Polymerasem," Journal of Bioscience and Bioengineering, 2000, vol. 90:4, pp. 456-458.

Leamon, J.H., et al., A massively parallel Pico Titer Plate (TM) based platform for discrete picoliter-scale polymerase chain reactions, Electrophoresis, 2003, vol. 24, pp. 3769-3777.

Ghadessy, F.J., et al., "Directed evolution of polymerase function by compartmentalized self-replication," PNAS, 2001, vol. 98, pp. 4552-4557.

Fleming, et al., "LD-PCR coupled to long-read direct sequencing: an approach for mutation detection in genes with compact genomic structures," Journal of Biochemical and Biophysical Methods, 2001, vol. 47:1-2, pp. 131-136.

Kamei, T., et al., "Integrated Hydrogenated Amorphous Si Photodiode Detector for Microfluidic Bioanalytical Devices," Analytical Chemistry, 2003, vol. 75, pp. 5300-5305.

Albarghouthi, M.N., "Poly-N-hydroxyethylacrylamide (polyDuramide): A novel hydrophilic self-coating polymer matrix for DNA sequencing by capillary electrophroesis," Electrophoresis, 2002. vol. 23, pp. 1429-1440.

Song, H., et al., "A microfluidic system for controlling reaction networks in time," Angewandte Chemie-International Edition 42, 2003. pp. 768-772.

Srinivasan, U., et al., "Alkyltrichlorosilane-based self-assembled monolayer films for stiction reduction in silicon micromachines," Journal of Microelectromechanical Systems, 1998, vol. 7, pp. 252-260.

Park, Nokyoung, et al., "Cylindrical Compact Thermal-Cycling Device for Continuous-Flow Polymerase Chain Reaction," Anal. Chem., Nov. 1, 2003, vol. 75, No. 21, pp. 6029-6033.

Mathies, R.A., et al., "Capillary array electrophoresis bioprocessors, Solid-State Sensor," Actuator and Microsystems Workshop, 2002, pp. 112-117, Hilton Head Island, SC, USA.

Ligler, F.S., et al., "Integrating Waveguide Biosensor," Anal. Chem., 2002, vol. 74, pp. 713-719.

Notice of Allowance and Fees Due mailed Aug. 13, 2008 from U.S. Appl. No. 10/750,533.

Allowed Claims from U.S. Appl. No. 10/750,533, Aug. 13, 2008.

Office Action dated Oct. 8, 2008 issued in U.S. Appl. No. 10/540,658.

Office Action Final dated Mar. 2, 2009 issued in U.S. Appl. No. 10/540,658.

International Search Report and the Written Opinion of the International Searching Report Oct. 29, 2007, Application No. PCT/US2005/018678.

Mathies, et al., U.S. Appl. No. 10/750,533, titled "Fluid Control Structures in Microfluidic Devices," filed Dec. 29, 2003.

Mathies, et al., U.S. Appl. No. 12/203,800, titled "Fluid Control Structures in Microfluidic Devices," filed Sep. 3, 2008.

Mathies, et al., U.S. Appl. No. 10/540,658, titled "Methods and Apparatus for Pathogen Detection and Analysis," filed Jun. 23, 2005.

Matiiies, et al., U.S. Appl. No. 11/139,018, titled "Microfabricated Integrated DNA Analysis System," filed May 25, 2005.

Office Action Final dated Aug. 27, 2008 issued in U.S. Appl. No. 11/139,018.

Office Action Final dated Apr. 29, 2009 issued in U.S. Appl. No. 11/139,018.

PCT Notification of Transmittal of the International Search Report and the Written Opinion of the International Searching Authority, or the Declaration, mailed Jul. 15, 2008, Application No. PCT/US2007/007381.

PCT Search Report mailed Oct. 29, 2007, Application No. PCT/US05/18678.

PCT Written Opinion mailed Oct. 29, 2007, Application No. PCT/US05/18678.

Press, W., et al., an Integrated Microfluidic Processor for Single Nucleotide Polymorphism-based DNA Computing, Lab on a Chip. 2005, 5:10, 8 pages.

Office Action Final dated Nov. 6, 2009 issued in U.S. Appl. No. 11/139,018.

Office Action Final dated Feb. 22, 2010 issued in U.S. Appl. No. 11/139,018.

* cited by examiner

MULTIPLEXED LATCHING VALVES FOR MICROFLUIDIC DEVICES AND PROCESSORS

CROSS-REFERENCE TO RELATED APPLICATIONS

This application claims priority under 35 U.S.C. 119(e) from Provisional U.S. Patent Application Ser. No. 60/785,005, filed Mar. 22, 2006, entitled "Multiplexed Latching Valves For Complex Microfluidic Devices And Processors", which is incorporated herein by reference.

BACKGROUND OF THE INVENTION

1. Field of the Invention

The present invention relates to microfluidic structures. In one example, the present invention relates to membrane valves and structures that control microfluidic flow and that can be combined to perform complex pneumatic logical operations.

2. Description of Related Art

Modern microfluidic analysis devices having evolved considerably from early single-channel, single-step devices. Highly-parallel, multi-channel devices now increase throughput by performing hundreds of assays simultaneously, and lab-on-a-chip devices now integrate complex multi-step preparation and analysis operations into a single portable analyzer. Devices that densely integrate both serial and parallel operations on-chip promise to dramatically cut the time and resources required to perform a variety of assays. For example, in the field of genomics, the integration of operations like colony picking, sequencing sample amplification, purification, and electrophoretic analysis into a high-throughput parallel platform will result in significant decreases in overall sequencing time and cost.

Realization of this goal has been slowed by the lack of valving and pumping technologies suitable for use in highly-serial, highly-parallel microdevices. These devices may require hundreds of valves to be actuated in parallel, while simultaneously hundreds of other valves are actuated one-by-one—an extremely demanding set of requirements. Part of the solution was offered by monolithic membrane valves and pumps, which can be fabricated in dense arrays and actuated in parallel via integrated pneumatic channels. However, each independent monolithic membrane valve or set of valves requires a dedicated switchable pressure/vacuum source (typically a solenoid valve) and a separate pneumatic connection to the microfluidic device. The power consumption, cost, and size of solenoid valves preclude their use in large numbers, and excessive pneumatic connections to the microfluidic device waste useful on-chip space.

A single control signal could be used to control several on-chip valves if 1) a demultiplexer is used to address which valve to open or close, and 2) each valve remains latched in its current state (open or closed) until it is set to a new state. Existing latching microvalves use bistable, buckled membranes or magnets to control flow. These silicon- or polymer-based valves are chemically and physically unsuitable for many lab-on-a-chip assays, are complex to fabricate, and cannot be easily arrayed for parallel or multiplexed actuation. Previous demultiplexers allow for addressing of individual microreactors in an array but not the more-useful, arbitrary control of independent valves. Also, the row/column addressing method employed previously imposes significant restrictions on the geometry of the device and limits the number of microreactors addressable by n control lines to only $2^{(n/2)}$.

SUMMARY OF THE INVENTION

In one aspect, the invention features a microfluidic latching valve structure. The latching valve structure includes input to the structure and at least three membrane valves. Each valve includes a valve input, a valve output, and a valve control. An elastomer membrane is configured such that the application of a pressure or a vacuum to the valve control causes the membrane to deflect to modulate a flow fluid through the valve. Two of the valves are connected to a third valve such that a sufficient vacuum at the input to the structure causes a third valve to open and upon removal of the vacuum, the third valve remains open and such that a sufficient pressure at the input to the structure causes the third valve to close and upon removal of pressure, the third valve remains closed.

Various implementations of the invention may include one or more of the following features. The latching valve structure is configured to control fluid flow to an on-chip microfluidic analytical device. The latching valve structure is configured to control a fluidic process of an assay of a microfluidic device. The latching valve structure further includes a demultiplexer configured to control an array of latching valves structured to performing an assay.

In another aspect, the invention features a microfluidic logic circuit. The logic circuit includes an array of membrane valves. Each valve includes a valve input, a valve output, a valve control, and an elastomer membrane wherein the application of a pressure or a vacuum can cause the membrane to deflect to modulate a flow of fluid through the valve. The membrane valves are connected in fluid communication with each other such that a pneumatic input to the array is logically operated upon to produce a pneumatic output.

Various implementations of the invention may include one or more of the following features. The array of membrane valves includes two membrane valves configured to form an AND gate or an OR gate. The array of membrane valves is configured to form a NAND gate or an XOR gate. The array of membrane valves is configured to form a buffer circuit. The array of membrane valves is configured to form a ripple carrier adder.

The invention can include one or more of the following advantages. Large numbers of multiplexed latching valve structures can be independently controlled by a small number of pneumatic lines, thereby reducing the size, power consumption, and cost of microfluidic lab-on-a-chip devices. That is, the latching valve structures can control microfluidic flow with a minimum of chip to world pneumatic interfaces. This includes but goes beyond multiplexers. These structures also enable the development of pneumatic logic processors. Monolithic valves and structures can be configured to function as transistors in pneumatic digital logic circuits. Using the analogy with N-channel MOSFETs, networks of pneumatically actuated microvalves can provide pneumatic digital logic gates (AND, OR, NOT, NAND, and XOR). These logic gates can be combined to form complex logical circuits like ripple carry adders. The invention also enables the development of digital pneumatic computing and logic systems that are immune to electromagnetic interference.

These and other features and advantages of the present invention will be presented in more detail in the following specification of the invention and the accompanying figures, which illustrate by way of example the principles of the invention.

BRIEF DESCRIPTION OF DRAWINGS

The invention may best be understood by reference to the following description taken in conjunction with the accompanying drawings that illustrate specific embodiments of the present invention.

FIG. 16A is a diagrammatic representation of selected outputs of the pneumatic 4-bit ripple carry adder of FIG. 14.

FIG. 16B is a diagrammatic representation of the output of several random inputs and worse case scenarios of carry propagation for the pneumatic 8-bit ripple carry adder of FIG. 15.

DETAILED DESCRIPTION OF THE INVENTION

Figure 1A:
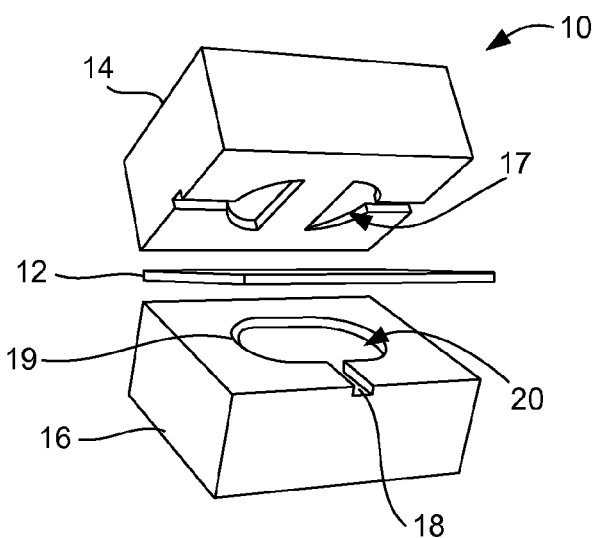
FIG. 1 is a diagrammatic exploded view of a membrane valve.
FIG. 1B is a diagrammatic view of an assembled membrane valve.
FIGS. 1C and 1D are diagrammatic cross-sectional views of the assembled valve of FIG. 1B shown in the closed and open positions, respectively.
Figure 1B:
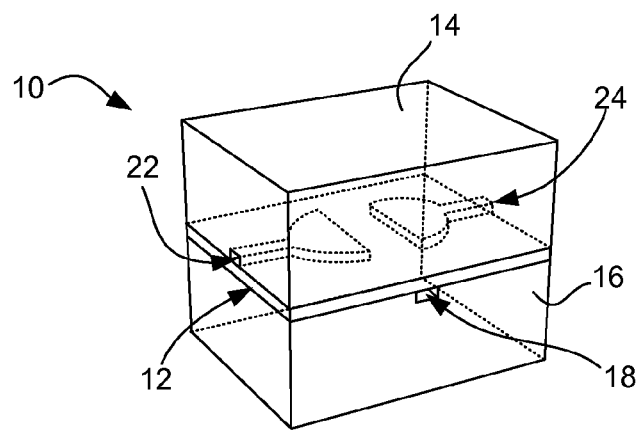
Figure 1C:
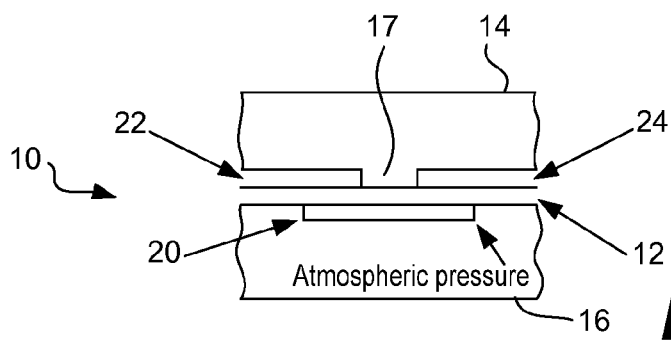
Figure 1D:
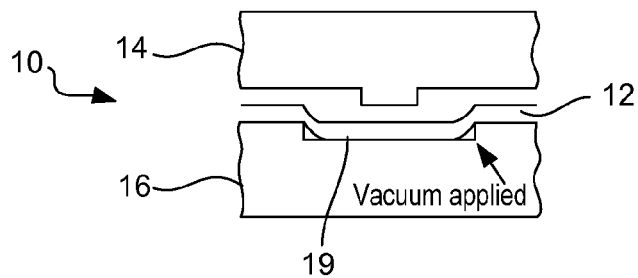

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of glass microfluidic devices, although other devices such as plastic or polymer devices could also be used.

It should be noted that the fluid control structures suitable for use in microfluidic devices can be applied to a variety of microfluidic devices. A pathogen detection system is a good example of one possible application that can benefit from the use of fluid control structures. Also, it should be noted that a fluid is considered to be an aggregate of matter in which the molecules are able to flow past each other, such as a liquid, gas or combination thereof, without limit and without fracture planes forming. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Some microfluidic devices include multichannel separation devices for high throughput analysis and analyzers that integrate sample preparation and analysis on a single chip. Devices that combine both multichannel analysis and integrated sample preparation are capable of reducing the amount of resources and cost needed to perform a variety of assays. An illustrative example may be found in the field of genomics: integration of sequencing sample preparation, purification, and electrophoretic analysis in a single device translates into decreases in assay time and cost and increased assay throughput efficiency and robustness. In all cases, a high level of integration in a microfluidic device requires a robust on chip mechanism for isolating, routing, merging, splitting, and storing volumes of fluid.

Some valve technologies for use in silicon, glass silicon, polymer, and elastomer microfluidic devices have addressed these requirements in a limited manner. However, many of these technologies are chemically or physically incompatible with many chemical or biochemical assays. Furthermore, many technologies lack the variety of robust surface modification chemistries available for glass microfluidic devices.

Microfluidic valves that are normally open require constant actuation to maintain fluidic control. A microfluidic device using such valves cannot be removed from a control system without losing control of the fluidic contents of the device. Furthermore, some devices use individually placed latex membranes. Individually placed pneumatically actuated latex membranes have been developed but this fabrication method prevents large scale integration into multichannel, high throughput analysis devices.

Other microfluidic devices are fabricated using anodically bonded silicon and glass wafers and actuated piezoelectrically. However, the electrical conductivity and chemical compatibility of silicon complicates its use in analytical devices. Thin films bonded to or deposited on silicon can only partially mitigate the electrical conductivity and chemical compatibility.

Elastomer devices have also been demonstrated. However these structures provide normally open valves that are undesirable as indicated above However, the hydrophobicity and porosity of elastomeric materials render elastomeric devices incompatible with many chemical and biochemical assays. It is thus desirable to minimize the fluidic contact with elastomer surfaces. Complex fabrication, chemical compatibility, unreliable fluid manipulation, and other problems have made existing fluidic manipulation technologies inadequate for integration into large-scale, high-throughput lab-on-a-chip devices.

Consequently, the techniques and mechanisms of the present invention provide membrane valve structures and demultiplexers suitable for high density integration into microfluidic devices. A variety of fluid control structures based on the membrane valves are provided, including processors.

A microfluidic device having a membrane latching valve structure is one example of a particularly suitable device for implementing a pathogen detection system on a chip. According to various embodiments, the pathogen detection system includes immunocapture and DNA analysis mechanisms such as polymerase chain reaction (PCR), and capillary electrophoresis (CE) mechanisms. In one example, the pathogen detection system can be implemented on a glass microfluidic device having a variety of fluidic control structures.

The present invention, among other things, is directed to membrane valve structures and demultiplexers for microfluidic devices. These structures consist of special assemblies of membrane valves. The normally-closed nature of these valves is very important in the operation of the latching valve structures. Latching valves can be fabricated and actuated in dense arrays, are compatible with common assay chemistries, and can be controlled by an on-chip demultiplexer. A total of $2^{(n-1)}$ independent latching valves can be controlled by n pneumatic lines.

In one embodiment, the latching valve structures may use monolithic membrane valves. However, the present invention is not limited to monolithic membrane valves. Membrane valves formed by, for example, a multi-step lithographic process may also be used in the present invention.

Devices containing monolithic membrane valves and pumps are described in W. H. Grover, A. M. Skelley, C. N. Liu, E. T. Lagally, and R. A. Mathies, *Monolithic membrane valves and diaphragm pumps for practical large-scale integration into glass microfluidic devices*, Sensors and Actuators B-Chemical, 89(3):315-323, 2003 ("Grover et al."), which is incorporated herein by reference. See also, U.S. patent application Ser. No. 10/750,533, filed Dec. 29, 2003, entitled "Fluid Control Structures In Microfluidic Devices", which is also incorporated herein by reference. Briefly, photolithography and wet chemical etching are used to etch device features into glass wafers, which are then bonded together using a polydimethylsiloxane (PDMS) membrane sandwiched between the wafers. Optionally, two or more etched or drilled glass wafers can be thermally bonded together prior to PDMS bonding; the resulting devices contain all-glass fluid layers that minimize fluid-PDMS contact.

Previous devices containing monolithic membrane valves and pumps tended to have all pneumatic channels localized in one wafer (the "pneumatic wafer") and all fluid channels localized across the PDMS membrane in another wafer (the "fluidic wafer"). See, Grover et al. The membrane valves of the present invention contain pneumatic features (pressure or vacuum) in both wafers, and these features can be etched into either wafer as long as correct pneumatic and fluidic connections between valves are maintained. For this reason, the pneumatic/fluidic designation has been abandoned in favor of a description that emphasizes connections between the valves' inputs and outputs (previously called "valve seats" in the fluidic wafer) and controls (previously called "displacement chambers" in the pneumatic wafer).

A membrane valve 10 and the normally-closed nature of such a valve is illustrated in FIGS. 1A-1D. As shown, a PDMS membrane 12 is sandwiched between two wafers or substrates 14 and 16. When a vacuum is applied to a control channel 18, the membrane 12 is pulled from its valve seat 17 into a displacement chamber 20 to abut against a wall 19 of the displacement chamber. As such, fluid is free to flow from an input channel 22 to an output channel 24. The nature of a glass-PDMS bond makes the valve effective for controlling on-chip flows of gas as well.

Table 1, in which the pressures are exemplary for a particular embodiment, presents a "truth table" for pneumatic logic for the six possible assignments of pressure ("P"), vacuum ("V"), and no connection ("N") (atmospheric pressure) to the control and input channels or connections 18 and 22, respectively, of the membrane valve 10.

TABLE 1

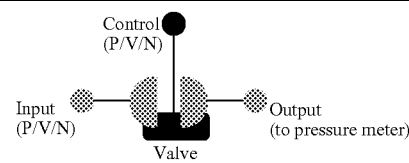

| Rule | Maintained at input/kPa | Maintained at control/kPa | Measured at output/kPa |
| --- | --- | --- | --- |
| PP | 40 | 40 | 0 |
| PV | 40 | −85 | 40 |
| PN | 40 | 0 | 40 |
| VP | −85 | 40 | 0 |
| VV | −85 | −85 | −83 |
| VN | −85 | 0 | 0 |

P = pressure (40 kPa)
V = vacuum (−85 kPa)
N = no connection

The "normally closed" nature of the valve keeps the valve sealed when equal pressures are applied to the input and control connections or channels, and no pressure reaches the output (Rule PP). Input pressure is passed undiminished to the output if vacuum is applied to the control (Rule PV). If the input pressure is large enough to force the valve open, the output can be pressurized even if no connection is made to the control connection (Rule PN). Vacuum applied to the input connection seals the valve against the valve seat regardless of whether there is pressure or no connection at the control (Rules VP and VN). Finally, input vacuum is passed to the output if vacuum is applied to the control connection (Rule VV), but the valve remains open only as long as the output connection is at a higher pressure than the input and control connections. Once the output vacuum reaches approximately 98% of the input vacuum, the "normally closed" nature of the valve dominates and the valve closes. By applying these rules, valve-based circuits for performing specific on-chip tasks can be implemented.

Pneumatic logic structures that exploit the capabilities of the membrane valves may be employed. Simple three- and four-valve networks can function as latching valves. Other networks having a different number of valves may also be employed in context of the present invention. These valves maintain their open or closed state even after all sources of vacuum and pressure are removed from the device. Principles of pneumatic logic can be used to fabricate an on-chip valve-based demultiplexer that distributes millisecond duration vacuum and pressure pulses to set the latching valves open and closed. Using pneumatic logic structures, n off-chip pressure/vacuum pneumatic control lines can be used to control $2^{(n-1)}$ independent latching valves. These pneumatic logic structures reduce or eliminate off-chip controllers. The operation of complex lab-on-a-chip devices could be programmed into and controlled by such on-chip pneumatic logic structures.

Figure 2A:
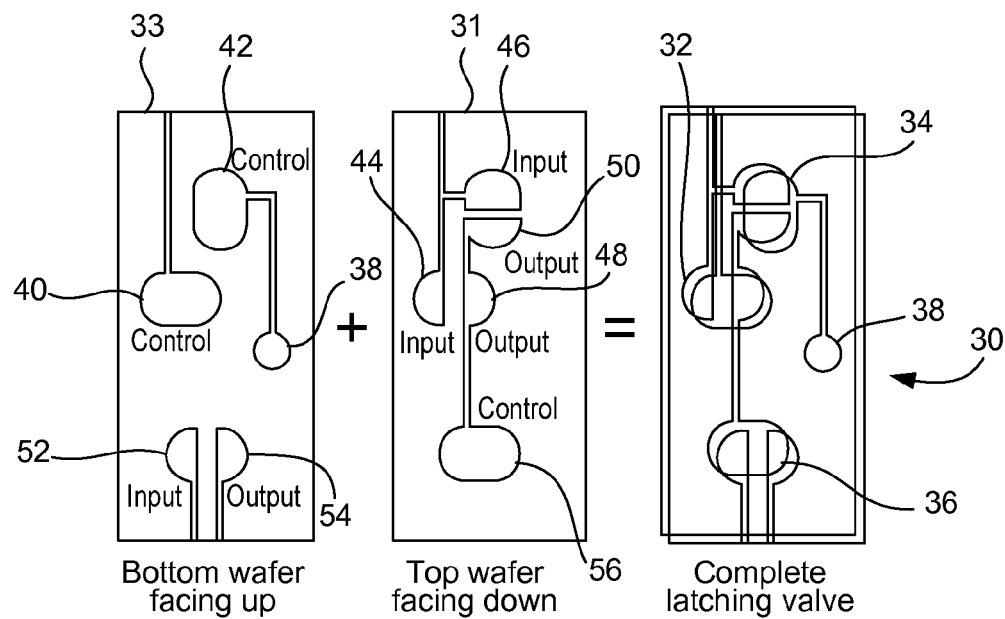
FIG. 2A is a diagrammatic illustration of the assembly of a vacuum-latching (V-latching) valve structure.
Figure 2B:
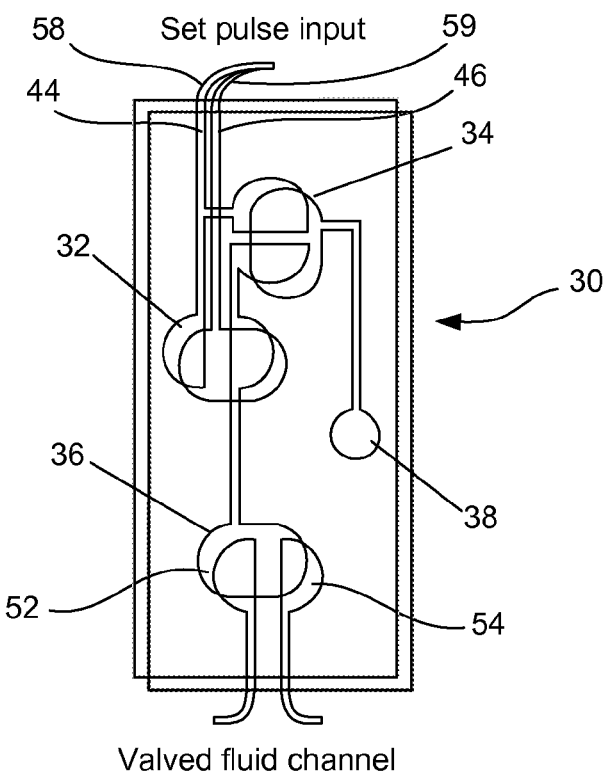
FIG. 2B is a diagrammatic representation of the assembled V-latching valve structure of FIG. 2A.

FIGS. 2A and 2B depict a three-valve circuit that forms a vacuum-latching ("V-latching") membrane valve structure or V-latching valve 30. The V-latching valve 30 includes a vacuum valve 32, a pressure valve 34, a latching valve 36, and a vent 38. Each valve is a membrane valve formed by sandwiching a PDMS membrane between the wafers 31 and 33. As shown, the features of the latching valve structure 30 are either formed in a top wafer 31 or a bottom wafer 33.

The vacuum valve 32 and the pressure valve 34 each include a control 40 and 42, respectively. Additionally, the vacuum valve 32 and the pressure valve 34 each include an input 44 and 46, respectively, and an output 48 and 50, respectively. Likewise, the latching valve 36 includes an input 52, an output 54, and a control 56. The vent 38 is open to the atmosphere. As such, it functions analogously to an electrical ground for the valve structure 30. The valve structure 30 further includes "set pulse input" or pulse input channels 58 and 59.

The control for the latching valve 36 is connected to or in fluid communication with the vacuum valve 32 (responsible for holding the latching valve open by sealing a vacuum on-chip via Rule VV) and the pressure valve 34 (responsible for eliminating the sealed on-chip vacuum via Rule PN). The resulting circuit holds the valve open or closed after a short vacuum or pressure pulse is applied to "set pulse input" channels 58 and 59. A related pressure/vacuum-latching ("PV-latching") membrane valve structure or PV-latching valve 60 uses trapped vacuum to hold the latching valve 36 open and trapped pressure to hold the valve closed against a wider range of fluid pressures. (See FIG. 3B).

Figure 3A:
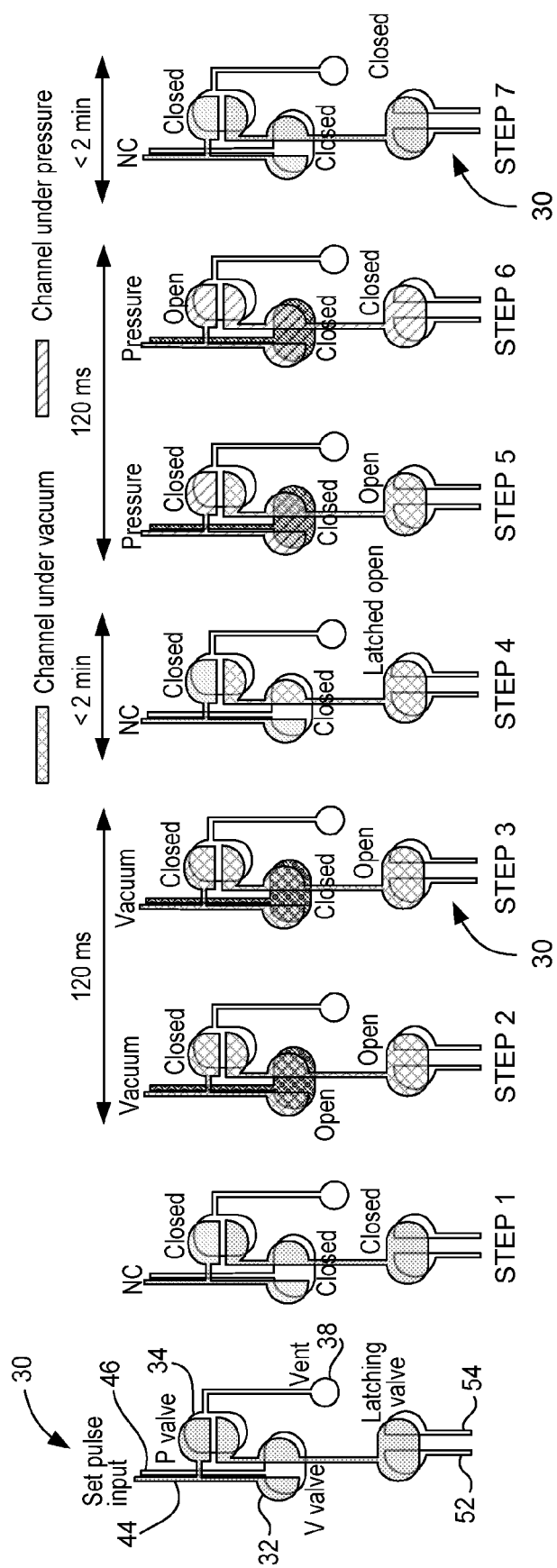
FIGS. 3A and 3B are diagrammatic representations of the structure and operation of a V-latching valve and a PV-latching valve, respectively.

In the V-latching valve 30 shown in FIGS. 2A-2B, and 3A, pulses of pressure and vacuum in the "set pulse input" channels 58 and 59 are supplied to the input 46 of the pressure valve 34, and the input 44 and the control 40 of the vacuum valve 32. Since these valves are actuated by and operate upon pressurized and depressurized air, for example, the usual references to fluidic and pneumatic connections are discarded in favor of the input, control and output connections illustrated in Table 1. The pressure, vacuum, and latching valves are normally closed (step 1 in FIG. 3A). When a pulse of vacuum is applied to the "set pulse input" in step 2, the vacuum valve opens (Rule VV in Table 1) and the pressure valve remains closed (Rule VN). The latching volume (the channel volume containing the outputs of the pressure and vacuum valves and the control of the latching valve) is depressurized, and the latching valve opens. In one embodiment, in less than 120 ms, when the latching volume has been depressurized to approximately 98% of the set input vacuum, the vacuum valve closes automatically (Step 3). When the set input vacuum pulse is removed in Step 4, the latching volume is sealed under vacuum by the pressure and vacuum valves according to Rule VN, and the latching valve will remain latched open as long as adequate vacuum remains in the latching volume.

To close the V-latching valve 30, a pulse of pressure is applied to the "set pulse input" in step 5. Within 120 ms, this pressure forces the pressure valve open according to Rule PN in step 6, and the now-pressurized latching volume seals the latching valve shut. When the set input pressure pulse is removed in step 7, the pressure in the latching volume escapes as the pressure valve closes. With no pressure in the latching volume to hold it closed, the latching valve can hold off fluid pressures, for instance, up to about 4 kPa without leakage.

Figure 3B:
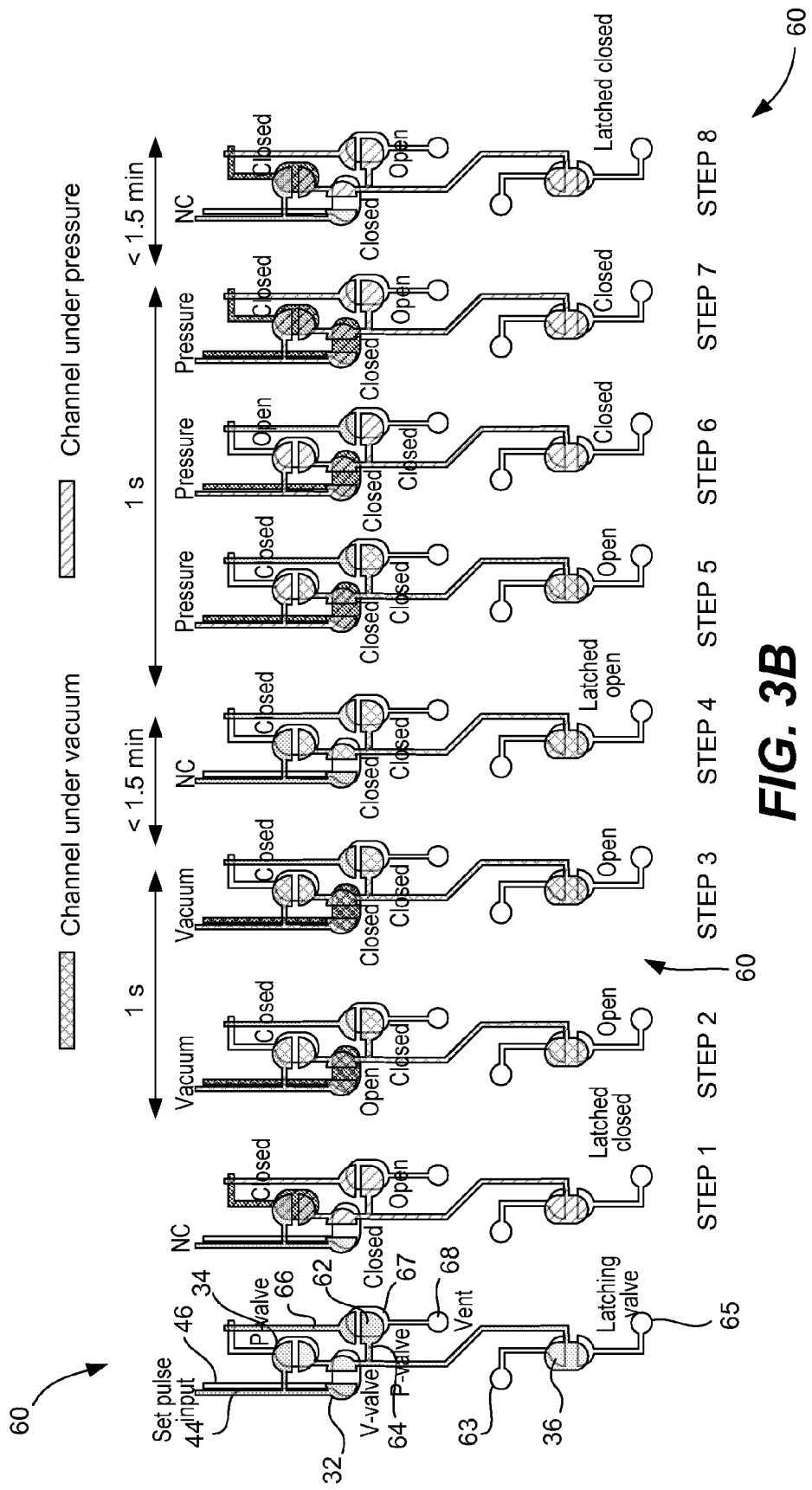

The PV-latching valve 60 shown in FIG. 3B can hold off larger fluid pressures because the latching volume is pressurized while the latching valve 36 is latched shut (step 1 in FIG. 3B). The PV-latching valve 60 is modeled after the V-latching valve 30 but includes a second pressure valve 62, with its input 66 connected to the control of the first pressure valve 34, its output 64 in fluid communication with or fluidly connected to the latching volume of valve 36, and its control 67 connected to the atmosphere via a vent 68. Also, the input and output of the latching valve 36 is connected to or in fluid communication with ports 63 and 65, respectively, for fluid flow through the valve.

In Steps 2 through 4 of FIG. 3B, a pulse of vacuum opens the PV-latching valve in a manner similar to the V-latching valve; the second pressure valve 62 remains closed because of Rule VN. To close the PV-latching valve, a pressure pulse is applied to the "set pulse input" in step 5. Within 1s, this pressure forces open the first pressure valve 34 by Rule PN in step 6, then forces open the second pressure valve 62 by Rule PN in step 7. With the latching volume and the control for the first pressure valve all pressurized, the first pressure valve closes according to Rule PP. When the set input pressure is removed in Step 8, the pressure in the latching volume actively holds the first pressure valve closed and pressure is maintained in the latching volume, thereby holding the PV-latching valve shut against fluid pressures up to about 17 kPa without leakage.

Both circuits (FIGS. 3A and 3B) contain the actual latching valve and two or three additional pneumatic logic valves. In the V-latching valve, 120 ms vacuum pulses (−85 kPa relative to atmospheric) applied to the "set pulse input" channels depressurize the latching volume and open the latching valve in Step 4. Pressure pulses (120 ms, 40 kPa relative to atmospheric) eliminate the vacuum in the latching volume and close the latching valve in step 7. "NC" indicates that no connection (only atmospheric pressure) is applied to the "set pulse input" channels. The PV-latching valve opens in a manner similar to the V-latching valve but traps pressure in the latching volume during closure (step 8). This pressure seals the latching valve closed against fluid pressures as high as about 17 kPa. Gray arrows show typical amounts of time for the specified steps.

The latching valve structures 30 and 60 were fabricated as follows. Device features were etched into glass wafers using conventional photolithography and wet chemical etching. Briefly, 1.1 mm thick, 100 mm diameter borosilicate glass wafers were coated with 200 nm of polysilicon using low-pressure chemical vapor deposition. The wafers were then spincoated with positive photoresist, soft-baked, and patterned with the device design using a contact aligner and a chrome mask. After development and removal of irradiated photoresist, the exposed polysilicon regions were removed by etching in $SF_6$ plasma and the exposed regions of the glass were etched isotropically in 49% HF to a depth of 50 μm. After stripping the remaining photoresist and polysilicon layers, the wafers were diamond drilled with 500 μm diameter holes for pneumatic and fluidic connections. The wafers were then scored and broken, and the resulting layers were bonded together using a 254 μm thick PDMS elastomer membrane. Optionally, two or more etched or drilled glass wafers can be thermally bonded together prior to PDMS bonding; the resulting structures contain all-glass fluid layers that minimize fluid-PDMS contact.

The latching valve structures 30 and 60 were characterized using variable-duration pressure (e.g., 40 kPa) and vacuum (e.g., −85 kPa) pulses from a computer-controlled solenoid valve. The pressures reported are relative to atmospheric pressure and were measured using a strain gauge pressure transducer. Flow rates through the latching valve structures were measured by connecting a variable-height column of water to the input of the latching valve structures. The valve output was then connected to a short piece of hypodermic tubing suspended in a vial of water on an analytical balance with 1 mg (1 μL) precision. The mass of water flowing through a valve structure per unit time was used to determine the volumetric rate of flow through the valve structure and, in turn, the open or closed state of the valve structure against the applied fluid pressure.

Figure 4A:
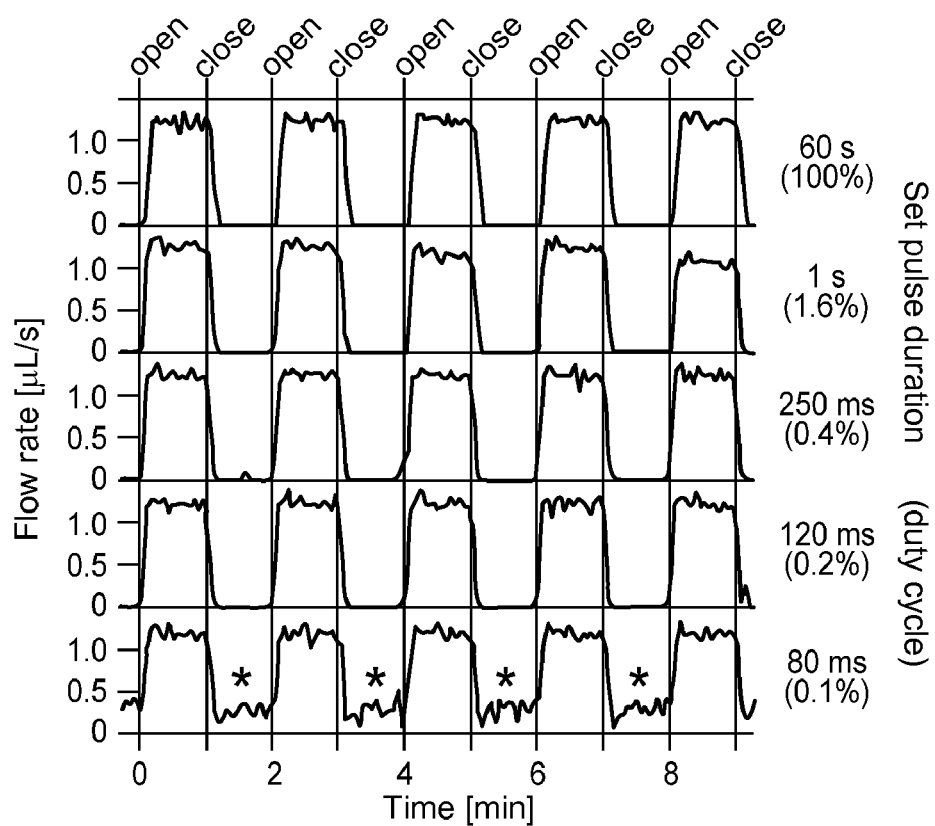
FIG. 4A is a graphical representation of the flow rates through a V-latching valve being set open and closed by vacuum and pressure pulses of varying durations.

To test the function of the latching valve structure 30, fluid flow through a latching valve structure was measured while pressure and vacuum pulses of varying durations were used to actuate the valve structure. In the first trace in FIG. 4A, 60 s of constant vacuum or pressure was applied to hold the V-latching valve open or closed. In subsequent traces, shorter pulses of vacuum and pressure were used to latch the latching valve open or closed. The similarity of the traces indicates that latching valve 36 behaves identically to the constant vacuum/pressure valves 32 and 34, with only 120 ms vacuum/pressure pulses required to reliably actuate the latching valve. Shorter pulses (80 ms) still opened the latching valve reliably but were too brief for reliable closure.

Figure 4B:
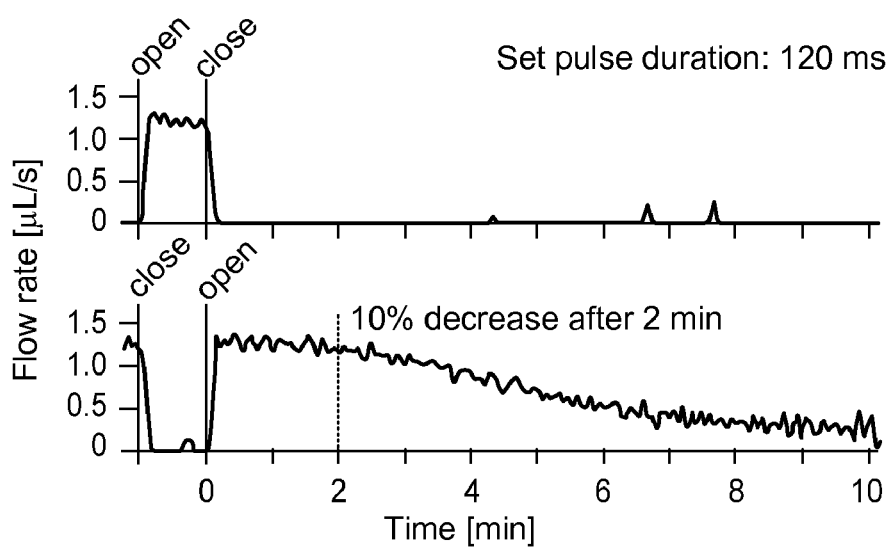
FIG. 4B is a graphical representation of flow rates through the same V-latching valve after being latched closed or open by a 120 ms pressure or vacuum pulse.

To determine the long-term stability of a valve structure 30 latched open or closed, flow through a latched valve structure was measured for ten minutes. The first trace in FIG. 4B shows that a 120 ms pressure pulse is adequate to latch the V-latching valve 30 closed for at least ten minutes. The second trace indicates that a 120 ms vacuum pulse latches the V-latching valve open for two minutes before the flow rate through the valve decreases by 10%. Owing to the gas permeability of the PDMS membrane, a gradual loss of vacuum in the latching volume slowly closes the latching valve and decreases the flow rate further over the next eight minutes.

The PV-latching valve 60 pressurizes the latching volume to hold the latching valve 36 closed against high fluid pressures. To confirm this behavior, V- and PV-latching valves were fabricated with drilled holes for measuring the pressure inside the latching volumes during valve actuation. The pressure inside the latching volume was measured while 10 s pressure and vacuum pulses were used to actuate the valve. While both valve designs retained vacuum (−60 kPa) in the latching volumes following the vacuum pulse, only the PV-latching valve 60 retained pressure (8 kPa) after the pressure pulse.

Figure 5A:
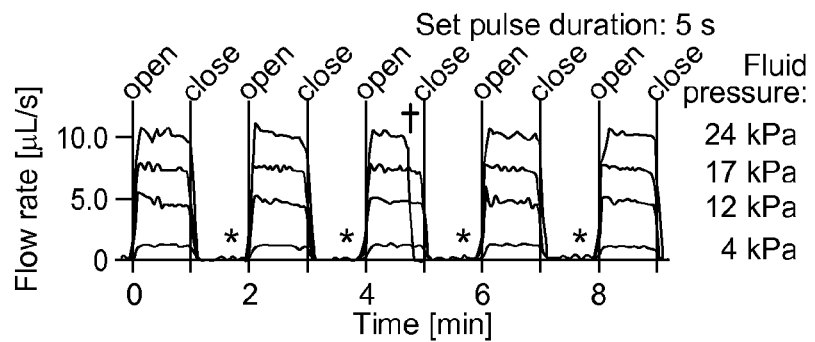
FIG. 5A is a graphical representation of flow rates through a PV-latching valve opening and closing against a range of fluid pressures.

To verify that the pressure retained in the PV-latching valve 60 holds the valve closed against high fluid pressures, pressure-driven fluid flow through a PV-latching valve was measured while actuating the valve with 5 s pulses of vacuum and pressure. FIG. 5A shows that fluid pressures as high as 17 kPa were held off by the valve when latched closed; at 24 kPa, leakage of approximately 1 μL s$^{-1}$ was detected through the closed valve. A premature valve closure observed only at the highest fluid pressure (dagger) was attributed to residual pressure trapped in the section of the pressure-latching volume between the pressure valves. This pressure leaked into the vacuum-latching volume while the valve was latched open, eliminating the trapped vacuum and closing the latching valve prematurely.

Figure 5B:
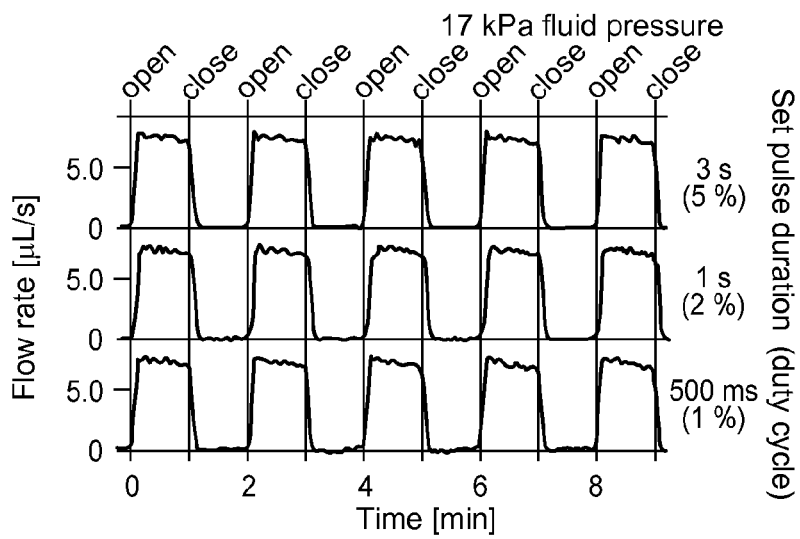
FIG. 5B is a graphical representation of flow rates through the same PV-latching valve, using pressure/vacuum pulses of different durations to open and close the valve.

In FIG. 5B, the shortest pressure pulse required for reliable sealing against 17 kPa fluid pressure was found to be 1 s. This is considerably longer than the 120 ms pulse required to close the V-latching valve, probably because the two pressure valves 34 and 62 must open in series via a relatively-slow Rule PN before the latching volume is pressurized and sealed.

Figure 5C:
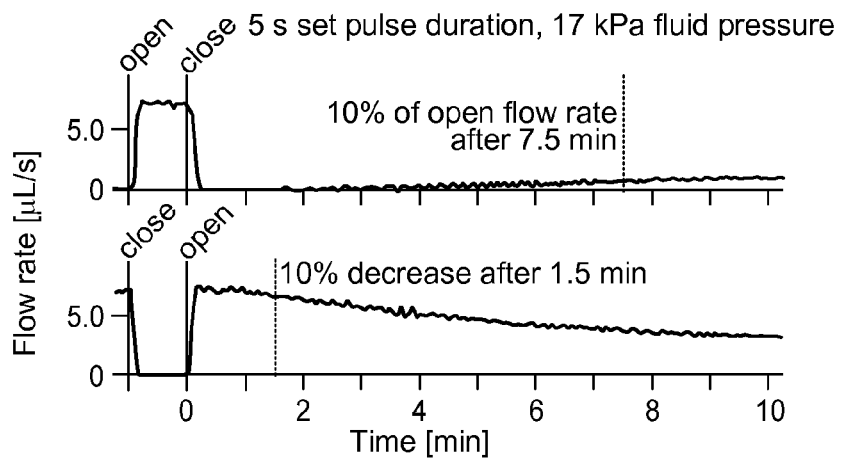
FIG. 5C is a graphical representation of flow rates through the same PV-latching valve following a 5 s pressure or vacuum pulse to hold the valve closed or open against a 17 kPa fluid pressure.

Finally, FIG. 5C confirms that the long-term stability of the latched open or closed PV-latching valve 60 compares favorably with the V-latching valve 30. A 5 s pressure pulse seals the PV-latching valve against 17 kPa fluid pressure for 7.5 min before flow through the valve rises to 10% of the open-valve flow rate. The second trace shows that a 5 s vacuum pulse holds the PV-latching valve open for 1.5 min before the flow rate drops by 10%.

Figure 6A:
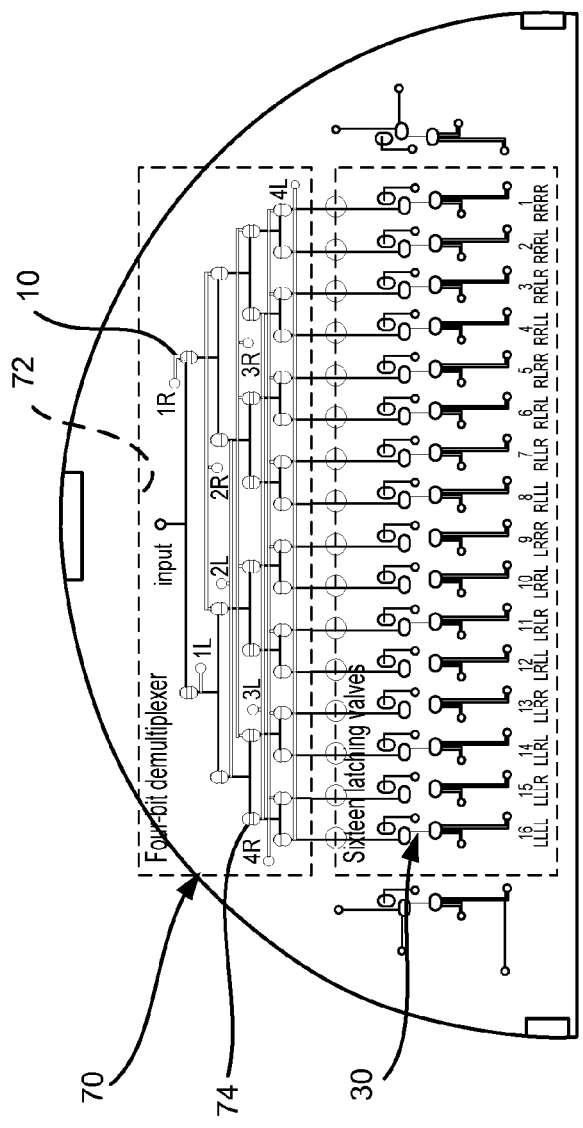
FIG. 6A is a diagrammatic representation of a 4-bit binary demultiplexer addressing 16 independent V-latching valves.

A four-bit binary demultiplexer 70 shown in FIG. 6A can address $2^4$ or sixteen independent V-latching valves 30 and distribute pressure and vacuum pulses to each of them in turn. A single "set pulse input" pressure/vacuum connection 72 at the top of the device in FIG. 6A provides the pressure and vacuum required to actuate the V-latching valves. The demultiplexer contains four rows 74 of membrane valves 10, with each row containing twice the number of valves of the previous row. Each row of valves in the demultiplexer is controlled by two pneumatic connections to a single off-chip 4/2 (four connection, two position) solenoid valve (not shown). The pneumatic connections are distributed on-chip in an alternating fashion to the demultiplexer valves in each row. For example, in the third demultiplexer row in FIG. 6A, pneumatic connection "3L" controls demultiplexer valves 1, 3, 5, and 7 (numbered left to right), and pneumatic connection "3R" controls demultiplexer valves 2, 4, 6, and 8.

When the solenoid valve controlling a particular row of demultiplexer valves is de-energized, pressure is applied to the odd-numbered demultiplexer valves and vacuum is applied to the even-numbered valves. The even-numbered valves open and "input" pressure or vacuum from the previous row is routed to the right into the next row of demultiplexer valves. When the solenoid valve is energized, pressure is applied to the even-numbered demultiplexer valves and vacuum is applied to the odd-numbered valves. The odd-numbered valves open and "input" pressure or vacuum is routed to the left into the next row of demultiplexer valves.

Figure 6B:
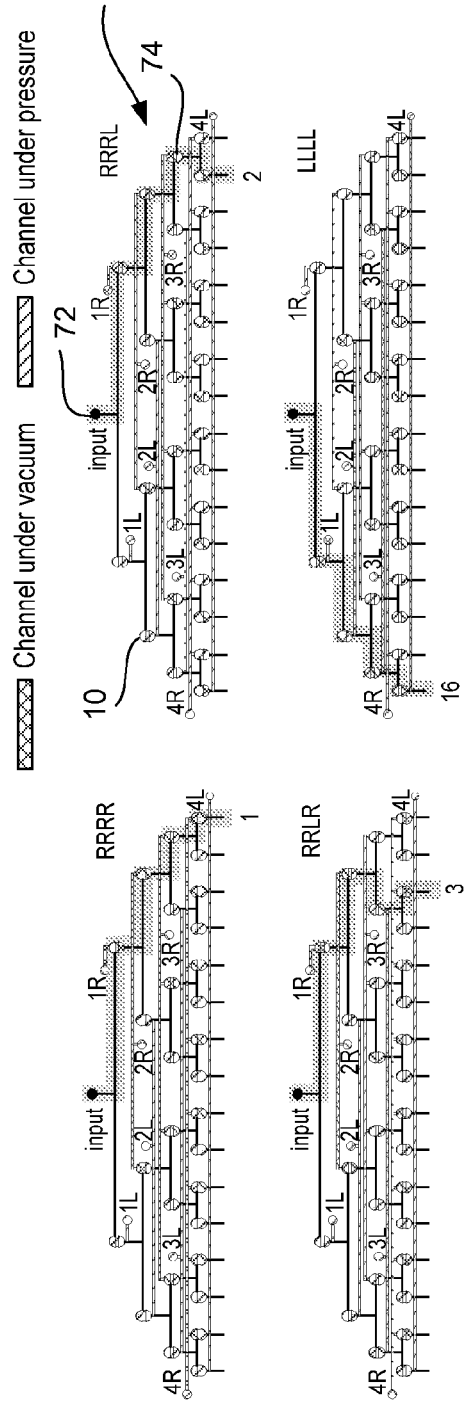
FIG. 6B is a diagrammatic illustration of the demultiplexer of FIG. 6A during 4 of 16 possible addressing operations.

An n-bit demultiplexer is addressed by setting each of the n rows to route "input" pressure/vacuum to either the right or the left, and the $2^n$ possible addresses range from "all right" to "all left" and every intermediate value. For n=4, four of the sixteen possible addresses (RRRR, RRRL, RRLR, and LLLL) are illustrated in FIG. 6B. Each unique address routes the "input" pressure or vacuum to a different V-latching valve. By actuating the demultiplexing valves according to a cyclic pattern that selects each latching valve in turn, and applying vacuum or pressure to the "input" connection at the appropriate time to open or close the selected latching valve, the latching valves can be opened or closed according to any arbitrary pattern. In this manner, an n-row demultiplexer operated by n solenoid valves can address $2^n$ independent latching valves.

A CCD camera was used to record movies of the demultiplexer test device during operation. By cycling the demultiplexer valves through all sixteen addresses in the binary counting order: RRRR, RRRL, RRLR, RRLL, RLRR, RLRL, RLLR, RLLL, LRRR, LRRL, LRLR, LRLL, LLRR, LLRL, LLLR, and LLLL, all sixteen V-latching valves are set in numerical order from 1 through 16 at a rate, for example, of 190 ms per step or 3 s per cycle.

Figure 7:
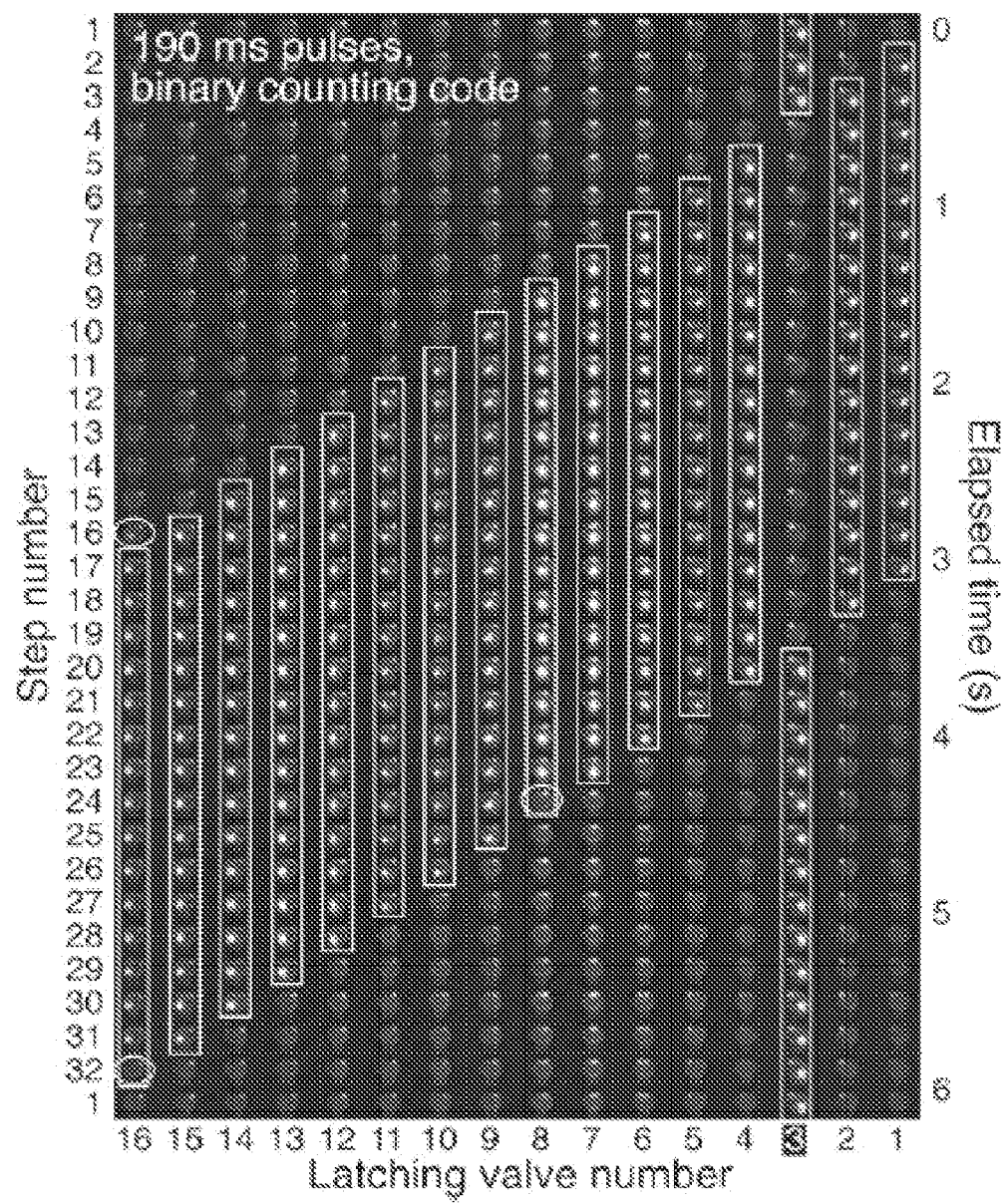
FIG. 7 is a diagrammatic representation of video frames showing the multiplexed latching valve device of FIG. 6A in operation, using a binary counting order to address the V-latching valve.

FIG. 7 represents a series of video frames showing the open/closed state of each latching valve at each of the 32 steps in a single demultiplexer cycle. Open valves appear brighter than closed valves because the stretched valve membrane forms a concave surface and reflects additional light from a fiber optic illuminator into the CCD. In steps 1 through 16 (step number), vacuum is distributed to open valves 1 through 16 (latching valve number) in turn, and in steps 17 through 32 pressure is distributed to close valves 1 through 16. Note that the state of valve three is intentionally negated, meaning that the demultiplexer must successfully route a single 190 ms pulse of pressure (step 4) during a series of 15 vacuum pulses, and a single 190 ms pulse of vacuum (step 20) during a series of 15 pressure pulses-an especially challenging operation for the demultiplexer.

While the observed pattern of open valves in FIG. 7 closely matches the expected pattern (white rectangles), three errors were found (white ovals): valve 8 closed early with valve 7 in step 24, and valve 16 opened early with valve 15 in step 16 and closed early with valve 15 in step 32. Each of these errors involves a valve opening or closing early with the previous valve. Such errors occur when only the least significant bit of the demultiplexer is switching, suggesting a malfunction associated with the least significant row of valves. Closer examination of the binary counting pattern used to operate the demultiplexer revealed that the least significant bit of the demultiplexer switches with every step, causing the sixteen demultiplexer valves associated with this bit to open or close every 190 ms. Errors of only a few milliseconds in the actuation of these overwhelmed demultiplexer valves evidently cause the observed errors.

To lessen the repetitive strain on the least significant bit demultiplexer valves, the binary counting order was replaced by the Gray code order: RRRR, RRRL, RRLL, RRLR, RLLR, RLLL, RLRL, RLRR, LLRR, LLRL, LLLL, LLLR, LRLR, LRLL, LRRL, and LRRR. This pattern sets the sixteen latching valves in the order 1, 9, 13, 5, 7, 15, 11, 3, 4, 12, 16, 8, 6, 14, 10, and 2 at a rate of only 120 ms per step or less than 2 s per cycle. Using this addressing order, demultiplexer valves are actuated at most every other step, or every 240 ms, compared with every 190 ms for the binary counting order.

Figure 8A:
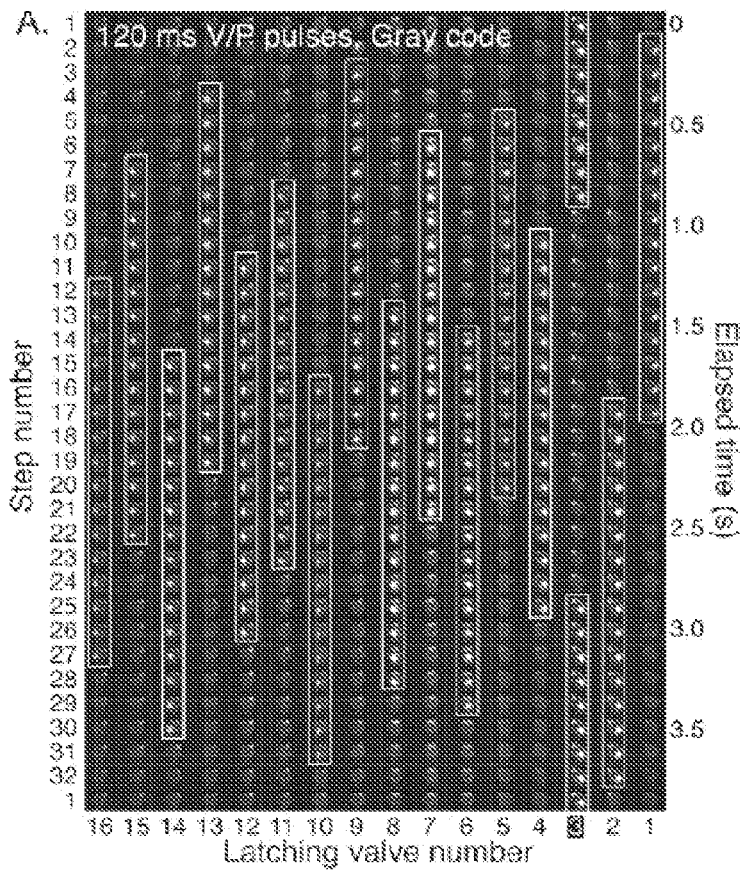
FIG. 8A is a diagrammatic representation of video frames showing the multiplexed latching valve device of FIG. 6A in operation, using a Gray code order for operating the demultiplexer.

The video frames of FIG. 8A show the open/closed state of each latching valve at each of the 32 steps in a single demultiplexer cycle that opens each valve in steps 1 through 16 and closes each valve in steps 17 through 32 (with valve 3 still inverted). The observed pattern of open valves exactly matches the expected pattern (white rectangles) with no errors, proving that the demultiplexer can accurately route pressure and vacuum pulses as short as 120 ms, for example, to the intended latching valves.

Figure 8B:
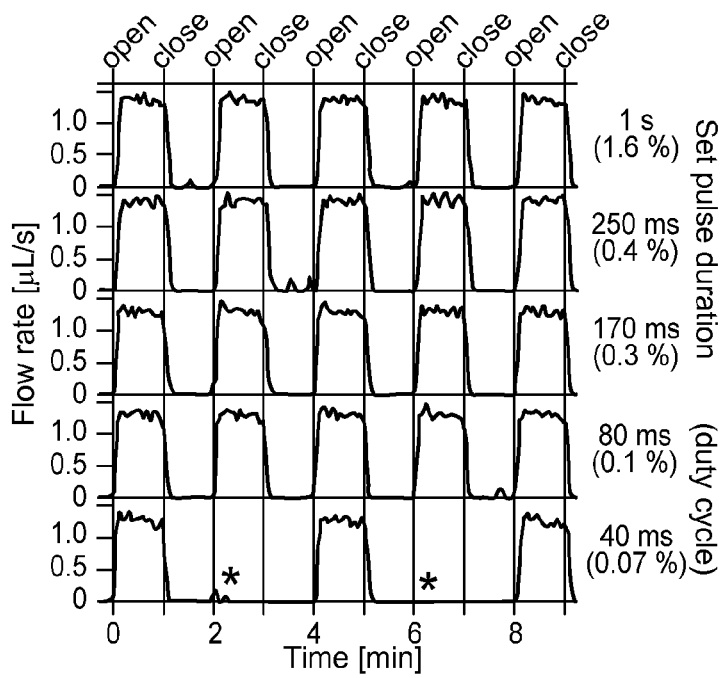
FIG. 8B is a graphical representation of flow rates through inverted latching valve 3, obtained while operating all 16 latching valves according to the actuation pattern shown in FIG. 8A.

In addition to confirming the operation of the demultiplexed latching valves visually, the ability of the demultiplexed valves to control fluid was also demonstrated. FIG. 8B presents the flow of fluid through the inverted valve 3 while all sixteen latching valves were being actuated according to the complex pattern in FIG. 8A. Pressure and vacuum pulses as short as 80 ms were adequate to open and close the inverted valve 3. Shorter pulses occasionally failed to open the valve, probably because of demultiplexer timing errors at fast actuation rates.

Latching pneumatic valve structures suitable for high-density integration into lab-on-a-chip devices have been described. By eliminating the need for a separate off-chip controller for each independent valve or parallel array of valves on-chip, the latching valve structures of the present invention make large-scale control of independent valves feasible. The V-latching valves can control on-chip fluid flow in a variety of assays involving low (for example, <4 kPa) fluid pressures, and the PV-latching valves close reliably against fluid pressures up to about 17 kPa. Latching valves retain the low (~10 nL) dead volumes found in monolithic membrane valves. Since the latching valve structures comprise membrane valves that can be operated continuously for hours and for tens of thousands of actuations without failure, it is anticipated that the long-term durability of these structures will be very favorable. The latching valve structures depend upon the normally-closed nature of the membrane valve. Rules PN (input pressure breaking through an unpowered valve), VN (input vacuum sealing an unpowered valve), and VV (a valve opening to evacuate a volume on-chip, then closing automatically to seal the volume under vacuum), all of which are essential to the operation of the latching valves, would be difficult or impossible to replicate using normally-open PDMS valves.

The valve-based pneumatic demultiplexer uses only n off-chip pneumatic inputs to control $2^{(n-1)}$ multiplexed latching valve structures. In this example, sixteen independent latching valves can be set in any arbitrary pattern every two seconds using only five pneumatic controls. The multiplexed latching valves retain their ability to independently control fluid flow. Since the pressure, vacuum, and demultiplexer valves that operate the latching valves never contact the valved fluid, the potential for cross-contamination between multiplexed latching valves is eliminated. Existing methods of on-chip logic using normally-open valves have proved to be very useful in addressing rectilinear arrays of microreactors but have not been applied to the arbitrary control of independent latching valves as with the present invention.

Vacuum and pressure pulses as short as 120 ms (8 valves per second) were found to be adequate to hold the V-latching valves open and closed for at least two minutes. In two minutes, 1000 independent latching valves can be set at a rate of 8 valves per second. This massive number of valves would require ($\log_2 1000$)+1 or only 11 off-chip pneumatic controls. The 10-bit demultiplexer would contain $2^{10+1}-2$ or 2046 valves, and each of the 1000 V-latching valves would require two logic valves, for a total of 4046 on-chip logic valves to control 1000 latching valves. If each logic valve and its associated pneumatic channels occupy 2 mm$^2$, 4000 logic valves could be fabricated using photolithography into a single glass PDMS-glass layer of a 10 cm diameter microfluidic device. One surface of this layer could then be bonded to additional wafers through another PDMS membrane, thereby forming a fluidic layer for the placement of the 1000 independent latching valves in the desired assay configuration. The prospect that a single additional layer in a lab-on-a-chip device could eliminate literally hundreds of off-chip solenoid valves, relays, and computers attests to the potential of pneumatic logical structures.

By reducing the off-chip control equipment necessary for the operation of microfluidic devices, multiplexed latching pneumatic valve structures should play an important role in making low-cost, low-power, and hand-held lab-on-a-chip analysis devices a reality. Analysis devices with fewer off-chip solenoid valves and electronic control circuits would consume less power and be better suited for battery-operated field use. Critically, in robotic analysis systems for space exploration, eliminating off-chip controllers would conserve sparse payload space and power. Also note that the pneumatic logic circuits like the demultiplexer presented here are immune to high energy particles, solar flares, and electromagnetic pulse interference, which can irreparably damage electronic logic circuits.

The present invention also establishes the basis for pneumatic logic gates, for example, generic, valve-based AND, OR, and NOT structures, which can be arranged into circuits or programs that encode and control the operation of any microfluidic device. In a classic example, flow through two membrane valves connected in series is allowed only if both valves are open—a logical AND. Similarly, flow through two membrane valves connected in parallel is possible if either (or both) of the valves is open—a logical OR. The feedback loops used to hold the latching valve open in the V-latching valve and closed in the PV-latching valve are closely analogous to NAND- and NOR-based latch circuits used as binary memories in electronic circuits. See, C. H. Roth, Jr., *Fundamentals of logic design*, West Publishing Company, 1985, which is incorporated herein by reference. These logical operations form the foundations of all electronic computations. It is believed that microfluidic logic structures of the type of the present invention will prove to be fundamentally useful in the assembly of complex pneumatic processors. It is also noted that the present invention is not limited to use with the particular logic gates specifically illustrated and described. The concept of the present invention may be used to construct various different logic gates and circuits.

Figure 9A:
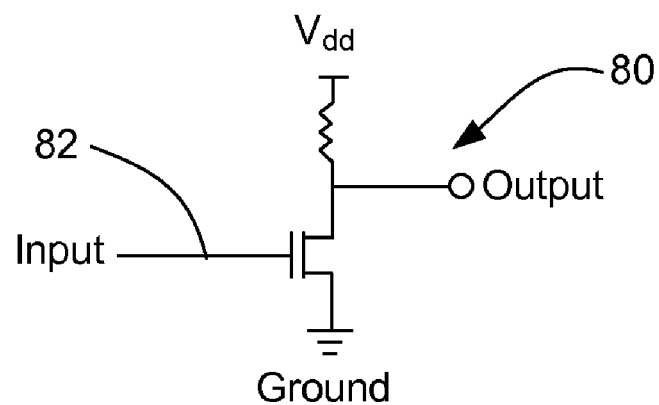
FIGS. 9A and 9B are diagrammatic representations of an NMOS logic gate and a membrane valve, respectively.
Figure 9B:
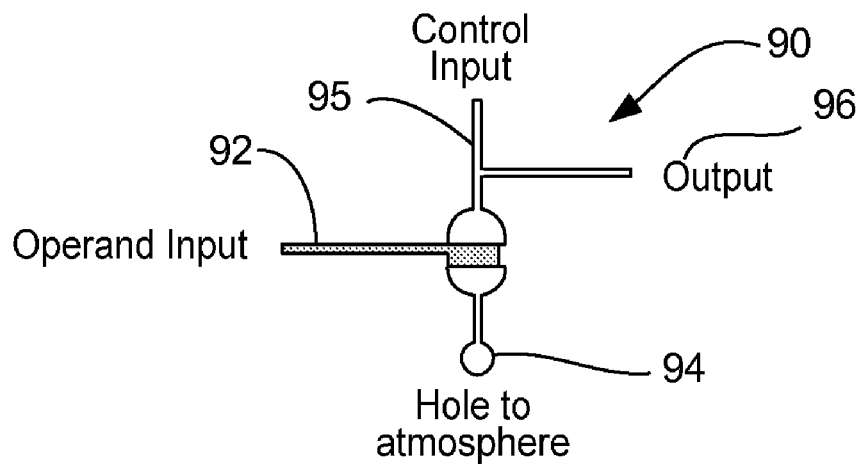

FIGS. 9A and 9B illustrate the relationship between a NMOS logic gate 80 and its implementation with a normally-closed, pneumatically actuated membrane valve 90 of the type described above. (See, FIG. 1). The application of a voltage to a control input terminal 82 of the N-MOSFET induces a current of electrons from the ground to the positive voltage power supply ($V_{dd}$), resulting in a significant decrease in the output voltage (false output). Similarly, the application of a vacuum to an operand input 92 of a pneumatic inverter opens the valve, resulting in a current of air from the vent 94 (hole to atmosphere) to a gate control input 95 which is supplied with a vacuum. This decreases the vacuum magnitude in the output channel 96 to a level that is insufficient for the actuation of downstream valves (pneumatic false). In both systems, a static current (electrical or pneumatic) flows during a logic low output, and a logic high output results when the input is false.

The pneumatic logic device of the present invention may be fabricated as discussed above. For device characterization, pneumatic inputs were supplied by the actuation of computer controlled solenoid valves for the evaluation of individual microvalves, logic gates, and the adder circuits. Separate pumps were used to supply logic high and logic low pressures to the solenoid valves. Pneumatic signals were conducted from the solenoid valves to the drilled chip inputs using polyurethane tubing with a 1.6 mm internal diameter and lengths ranging from 15-30 cm. Pressure measurements reported for single valves, logic gates, and the full adders are relative to atmospheric and were measured using a strain gauge pressure transducer (PM 100D, World Precision Instruments). Digital videos of the operation of 4 and 8-bit adders were recorded using a CCD camera.

Pneumatic logic gates are composed of networks of valves to which pneumatic signals are applied via gate input channels. Vacuums greater than −20 kPa, for example, are capable of valve actuation and therefore represent a logic high, or the "true" value of digital logic. Sub-threshold vacuum magnitudes represent a logic low, or the "false" value.

Figure 10A:
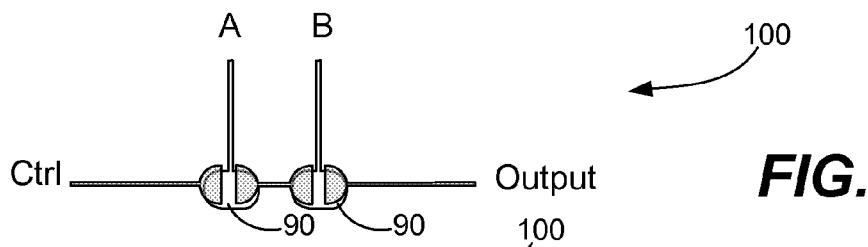
FIGS. 10A-10E are diagrammatic representations illustrating the layouts of several pneumatic logic gates using membrane valves.
Figure 10B:
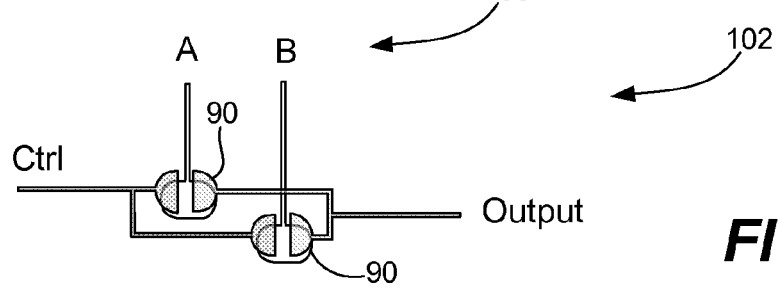
Figure 10C:
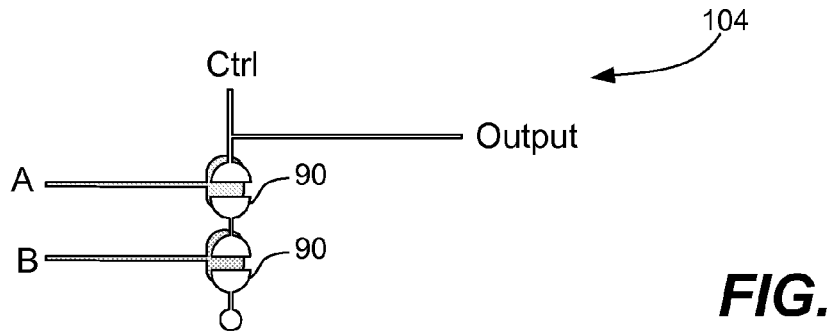
Figure 10D:
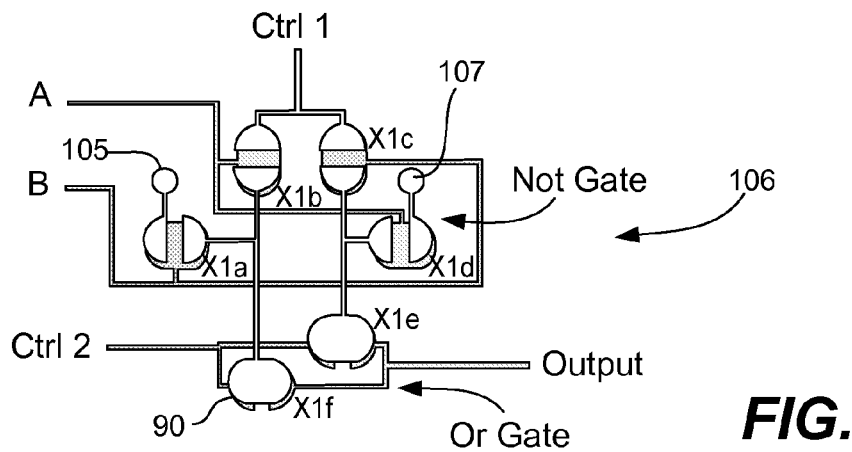

FIGS. 10A-10E show the layout of several pneumatic logic gates that operate similarly to NMOS logic gates. Each logic gate requires one or more gate control input (Ctrl) channels to which constant vacuum is applied during digital logic operations. Operand gate input channels (A and B) are supplied with −76 kPa as a logic high and 6 kPa as a logic low. A pneumatic AND gate 100 (FIG. 10A) is composed of two microvalves 90 connected in series. Vacuum will only be transmitted from the input to the output if both valves are actuated simultaneously. Similarly, a pneumatic OR gate 102 (FIG. 10B) is composed of two microvalves 90 connected in parallel. The pneumatic NAND gate 104 shown in FIG. 10C is a universal logic gate (a gate from which any logical function may be built) that functions similarly to a NOT gate. For this logic gate, the output is false if both inputs are true, and the output is true in all other cases.

Combinations of the AND, OR and NOT gates are also capable of universal logic operations. For instance, the pneumatic XOR 106 (FIG. 10D) is composed of a combination of NOT gates and OR gates. When only one of the operand inputs (A and B) is true, the Ctrl 1 input vacuum is transmitted to either X1$e$ or X1$f$ resulting in a logic high output. When both operand inputs are true, the opening of valves X1$a$ and X1$d$ creates a direct connection between the Ctrl 1 input and two vents 105 and 107 to the atmosphere. In this case neither X1$e$ nor X1$f$ are actuated, and no vacuum is transmitted to the output.

Figure 10E:
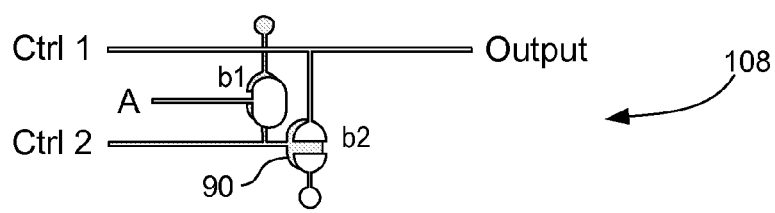

The buffer circuit 108 shown in FIG. 10E amplifies an input vacuum signal and enables successful signal propagation in more complex pneumatic logic circuits. This pneumatic buffer circuit is based on the relation, NOT(NOT(A))=A. With both control inputs held at about −87 kPa, application of a weaker vacuum to the operand input (A) opens valve b1. The opened connection to atmospheric pressure decreases the vacuum induced by the Ctrl 2 input, resulting in the closure of the valve b2. When valve b2 is closed, the full magnitude of the Ctrl 1 input is transmitted to the output.

As discussed, when the same vacuum magnitude is applied to the control and input channels of a single valve, the valve closes after the output channel has reached approximately 98% of the input and control vacuum. This feature can be used for the development of bistable latching valve circuits.

Figure 11A:
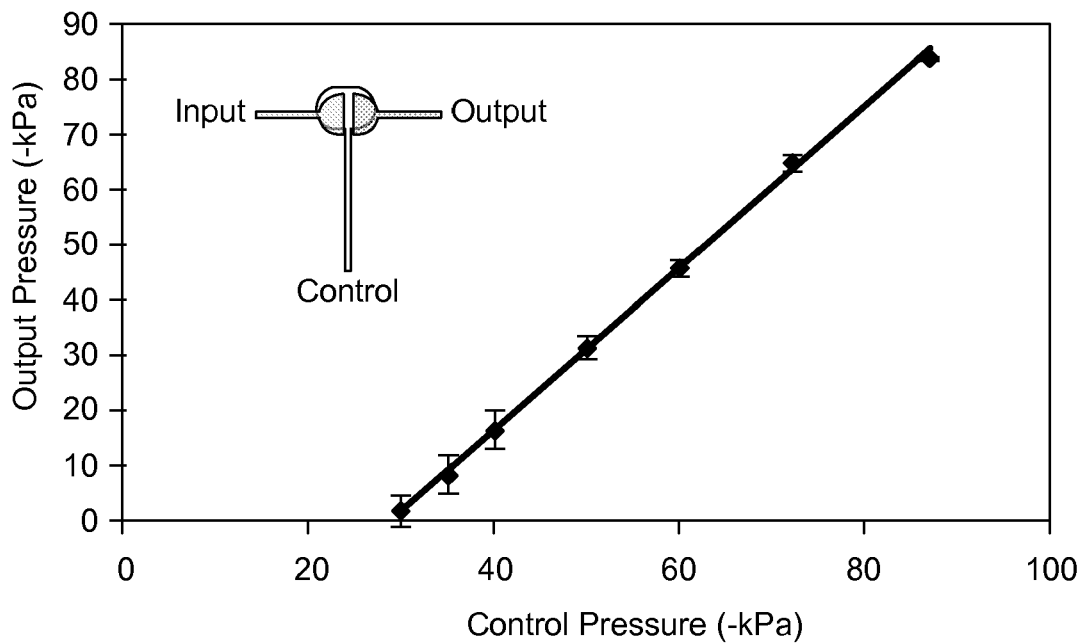
FIG. 11A is a graphical representation of output pressure versus control pressure for a membrane valve.
Figure 11B:
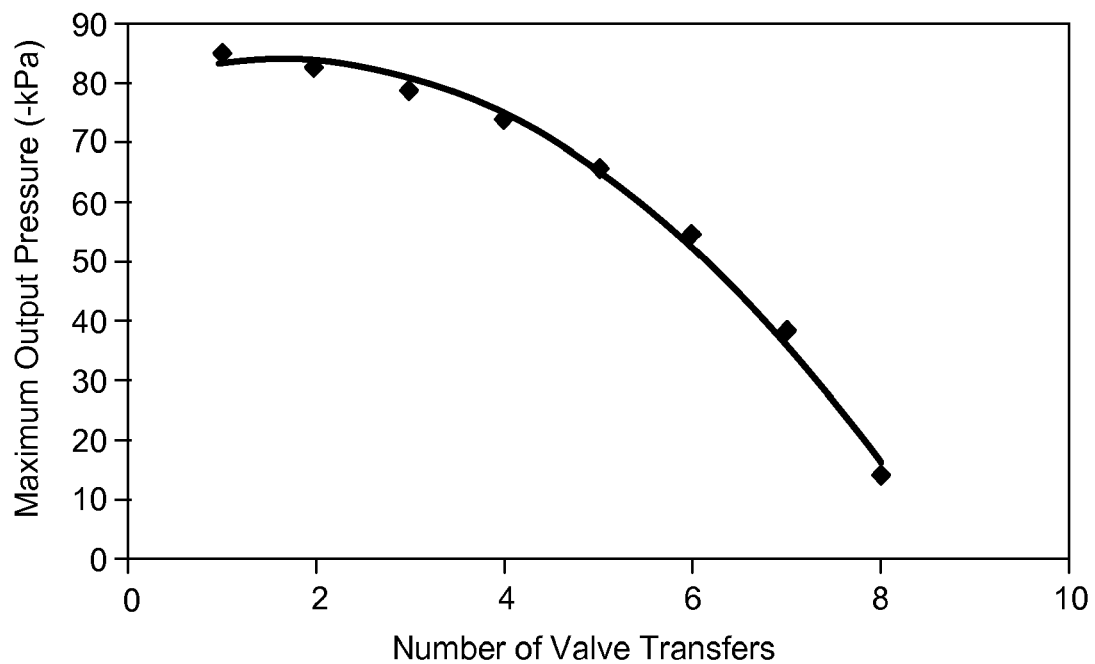
FIG. 11B is a graphical representation of the maximum output pressure versus the number of valve transfers for a membrane valve.

To characterize the pneumatic signal transduction through microvalves as a function of control channel pressure, individual valve input channels were supplied with a constant pressure of −87 kPa while the pressure in the control channels was varied using a separate vacuum pump. FIG. 1A shows a linear increase in output vacuum magnitude with increasing control vacuum magnitude. Since the slope of this curve (1.5) is greater than 1, a linear network in which the output of valve n is the control input of valve n+1 will exhibit an exponential decrease in output vacuum magnitude with increasing n. (FIG. 11B). This imposes a practical limit on the integration of pneumatic logical structures that do not employ a signal amplification mechanism such as the buffer circuit described above.

Figure 12:
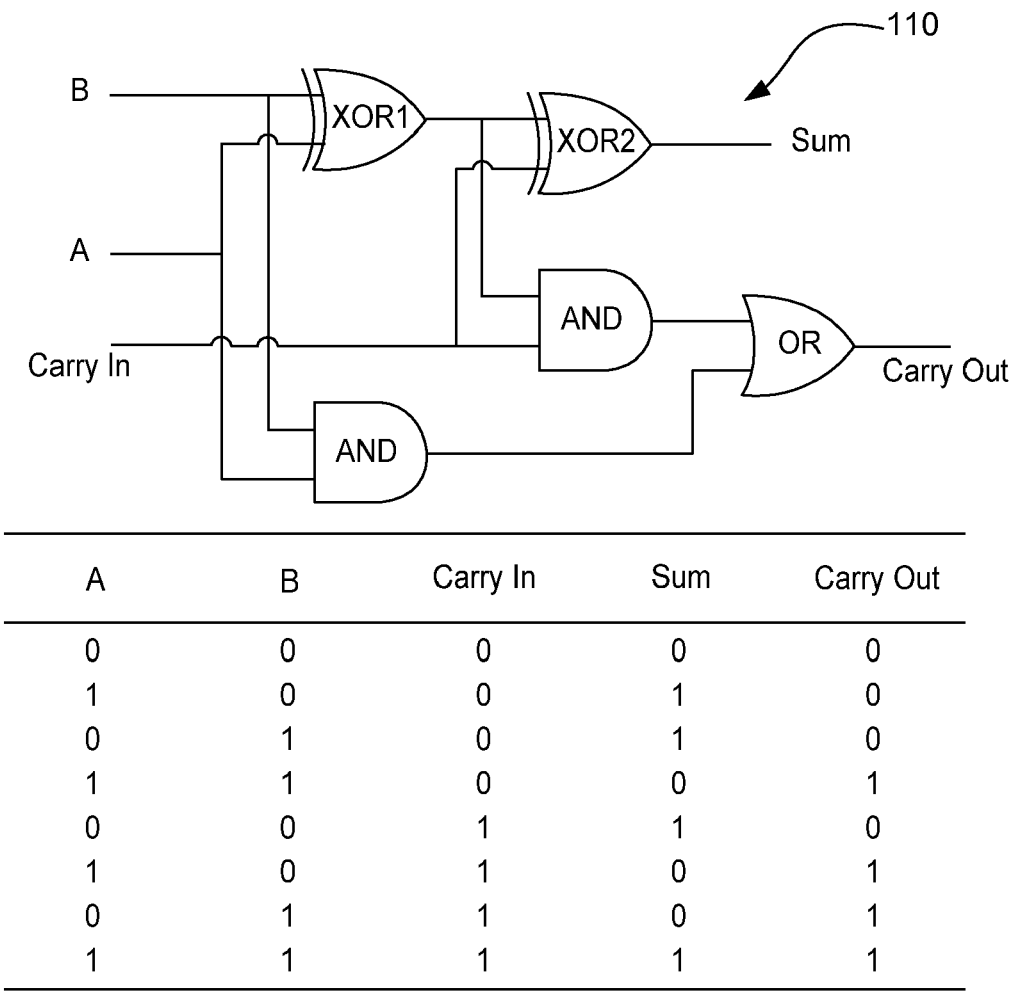
FIG. 12 is a schematic view illustrating the logic diagram and truth table for a binary full adder.

Since binary addition is used in a wide range of computing operations including subtraction and multiplication, it plays an important role in the operations performed by the CPU of a modern computer. FIG. 12 shows the logic diagram and truth table of a binary full adder 110. The operand inputs (A, B, and Carry In) are processed by a circuit of AND, OR and XOR gates resulting in two outputs, Sum and Carry Out. The truth table shows the expected logical outputs for all possible combinations of input values.

A pneumatic full adder 120 (FIG. 13) is composed of two XOR gates 122 and 124, and a hybrid OR gate 126 in which two AND gates are aligned in parallel. Four gate control inputs (Ctrl X1, Ctrl X2, Ctrl X1X2, and Ctrl C) are required for the operation of this circuit. From the resting state in which each valve is closed, all of the operand and control gate inputs are actuated simultaneously with the exception of X2 which is actuated after a 250 ms delay. This delay is necessary since the XOR2 gate processes the output of XOR1, which has a corresponding gate delay.

Figure 14:
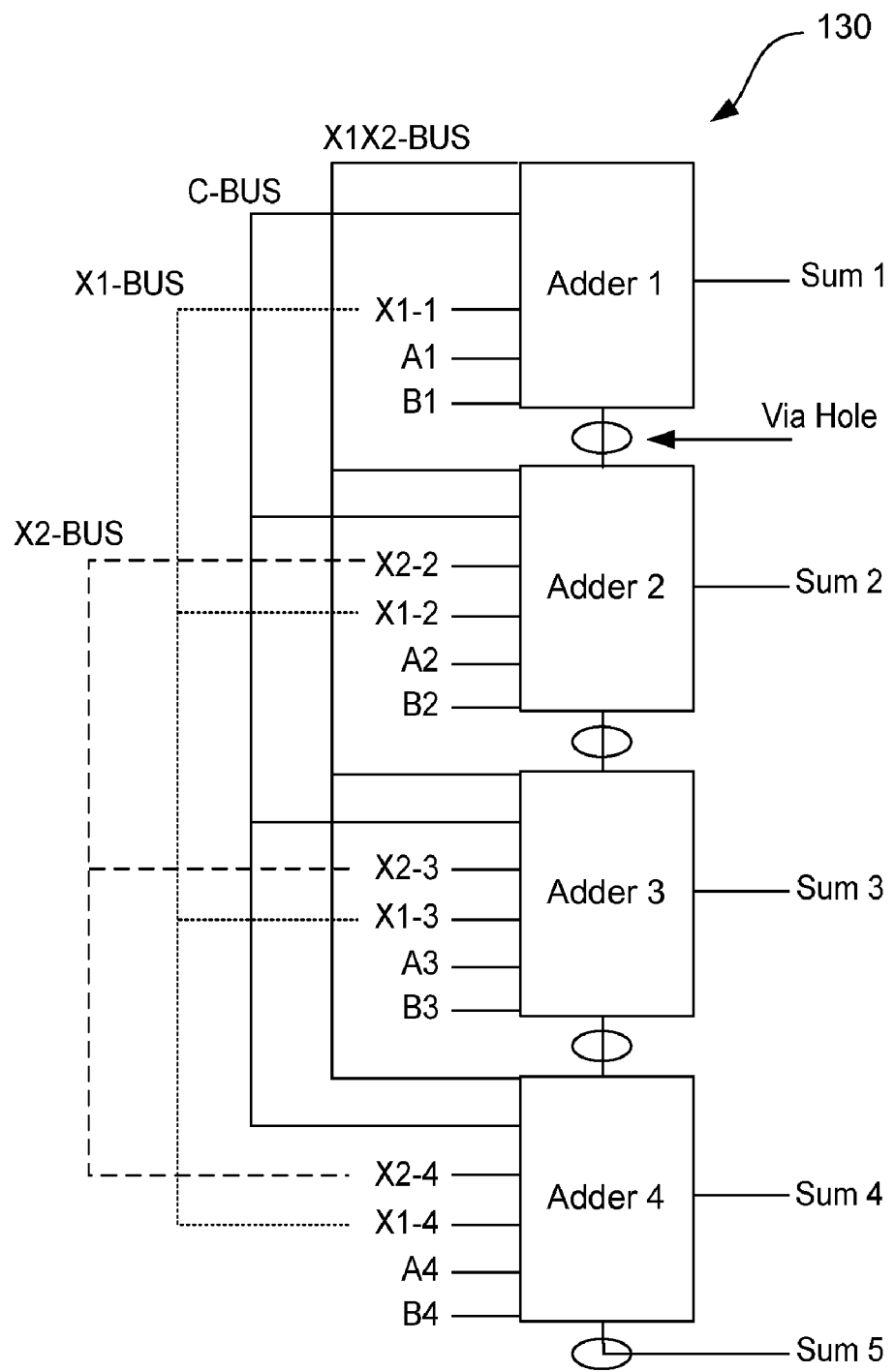
FIG. 14 is a schematic view of the layout of a pneumatic 4-bit ripple carry adder.

In a ripple-carry adder, multiple full-adders are chained together with the Carry Out of one adder connected to the Carry In of the next most significant adder. FIG. 14 shows the schematic layout of a pneumatic 4-bit ripple carry adder 130. During carry propagation, the pneumatic Carry Out of the adder may pass through a 2 mm diameter via hole in the PDMS membrane before actuating valves in an adjacent adder as the carry input. Each X1X2 control input is connected on-chip through a channel network that leads to a single drilled input hole (vent). A similar bus input system was designed for the Ctrl C inputs, whereas the X1 and X2 control inputs were separately combined using off chip tubing. Since each of the full adder control inputs are supplied with pneumatic signals in parallel through bus channels or off-chip tubing, only four off-chip controllers are required to actuate all of the control inputs of multi-bit adders. The output channels for sums and the final Carry Out convey pneumatic signals to a linear array of valves used as a readout of the computed sum. Half adders were incorporated into the circuits for addition of the least significant bits in the multi-bit adders.

Figure 15:
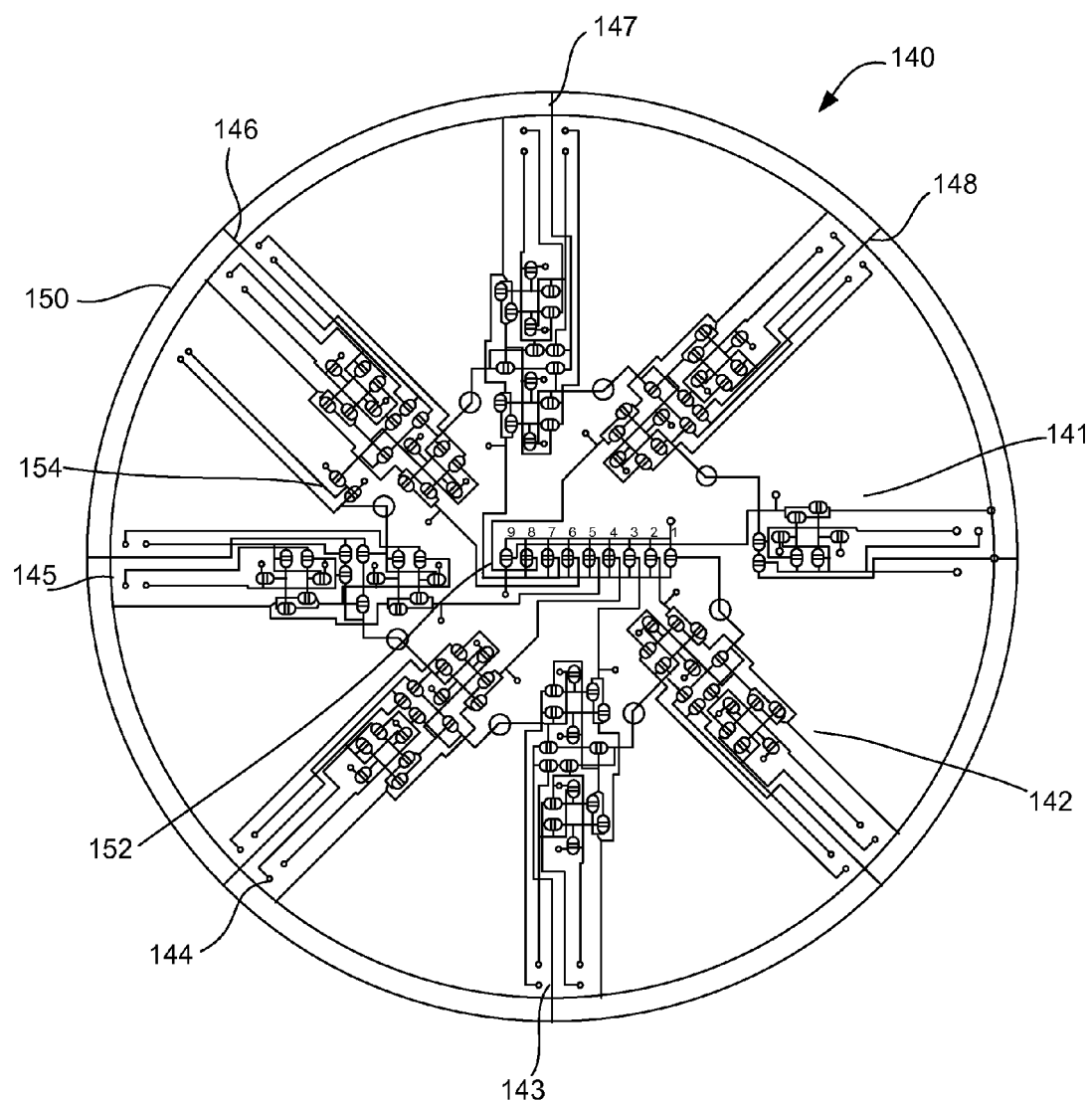
FIG. 15 is a diagrammatic view of a pneumatic 8-bit ripple carry adder.

In an pneumatic 8-bit ripple-carry adder 140, (FIG. 15), a similar bus architecture can be used to actuate the control inputs of the adders in parallel. The adders 141-148 are arrayed radially with output channels 150 for sums and the final carry extending to a linear array of readout valves 152 in the center of the chip. A buffer circuit 154 can be used to the Carry Out of the fourth adder to amplify the signal and ensure successful carry propagation through any number of the adders.

The propagation times and output magnitudes of each individual logic gate in FIGS. 10A-10E were characterized on a single fabricated device. For each logic gate, operand and control inputs were actuated simultaneously. Each logic gate generated output vacuum magnitudes that fall into the correct ranges for logic high or logic low as discussed above. The lowest magnitude for a logic high output was observed for the XOR gate (−63 kPa), since it is composed of the most complex network of valves. Latching of the output vacuum occurs in the XOR gate if all of the inputs are turned off simultaneously. This latched volume would eventually be restored to atmospheric pressure due to the gas permeability of the PDMS membrane; however, the process can be expedited by actuating the operand inputs while the control inputs are closed. Dynamic response times were defined as the interval between the actuation of off-chip solenoid valves and the opening of an output microvalve due to a logic high output. The longest response time (250 ms) was observed for the XOR gate. Since these response times include a delay due to the evacuation of tubing between the solenoid valves and the chip inputs, optimization of vacuum pump speed and the dimensions of off-chip tubing may significantly improve the speed of logical operations.

Table 2 is a truth table (in kPa) illustrating the output vacuum and pressure magnitudes of the pneumatic full adder 120 (FIG. 13) for all possible combinations of inputs.

TABLE 2

| A | B | Carry In | Sum | Carry Out |
|---|---|---|---|---|
| 6 | 6 | 6 | 0 | 0 |
| −87 | 6 | 6 | −46 | 0 |
| 6 | −87 | 6 | −48 | 0 |
| −87 | −87 | 6 | 0 | −65 |
| 6 | 6 | −87 | −64 | 0 |
| −87 | 6 | −87 | 0 | −55 |
| 6 | −87 | −87 | 0 | −54 |
| −87 | −87 | −87 | −65 | −65 |

Figure 13:
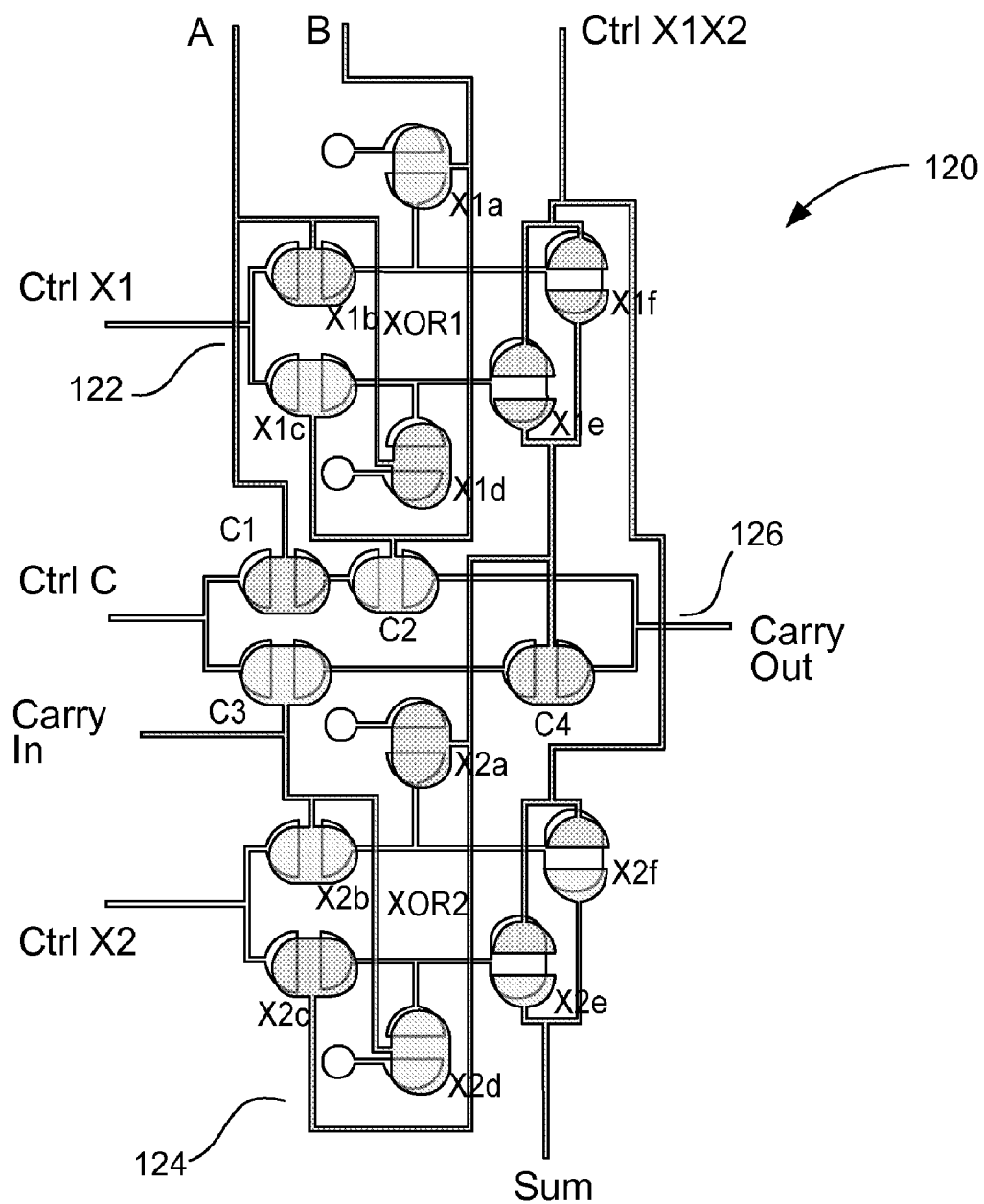
FIG. 13 is a diagrammatic representation of a pneumatic full adder.

As an example, the Carry Out is true when both XOR(A,B) is true and the Carry In is true. In these cases, the output of XOR1 is transferred to the control input of valve C4 (FIG. 13). The input of this valve is supplied with a ~−87 kPa signal via the Ctrl C gate input channel. Based on the −64 kPa logic high output of an individual XOR gate, and using the equation for the linear regression in FIG. 11A, a Cout vacuum of −54 kPa is predicted. This agrees with the experimentally determined values from the pneumatic full-adder. The operation of the full adder required a 250 ms delay for the actuation of the X2 control input. Delays less than 250 ms are insufficient for the transfer of output from XOR1 to the input of XOR2 and therefore result in incorrect output sums. To avoid latching of gates within the adder, an 8-step, 2 second closing procedure can be used to expedite a return to the resting state. More complex closing procedures are not required for multi-bit adders since the closing program can be applied to each adder in parallel. No vacuum is transmitted to the Carry Out or Sum outputs during these closing procedures.

Figures 16A, 16B:
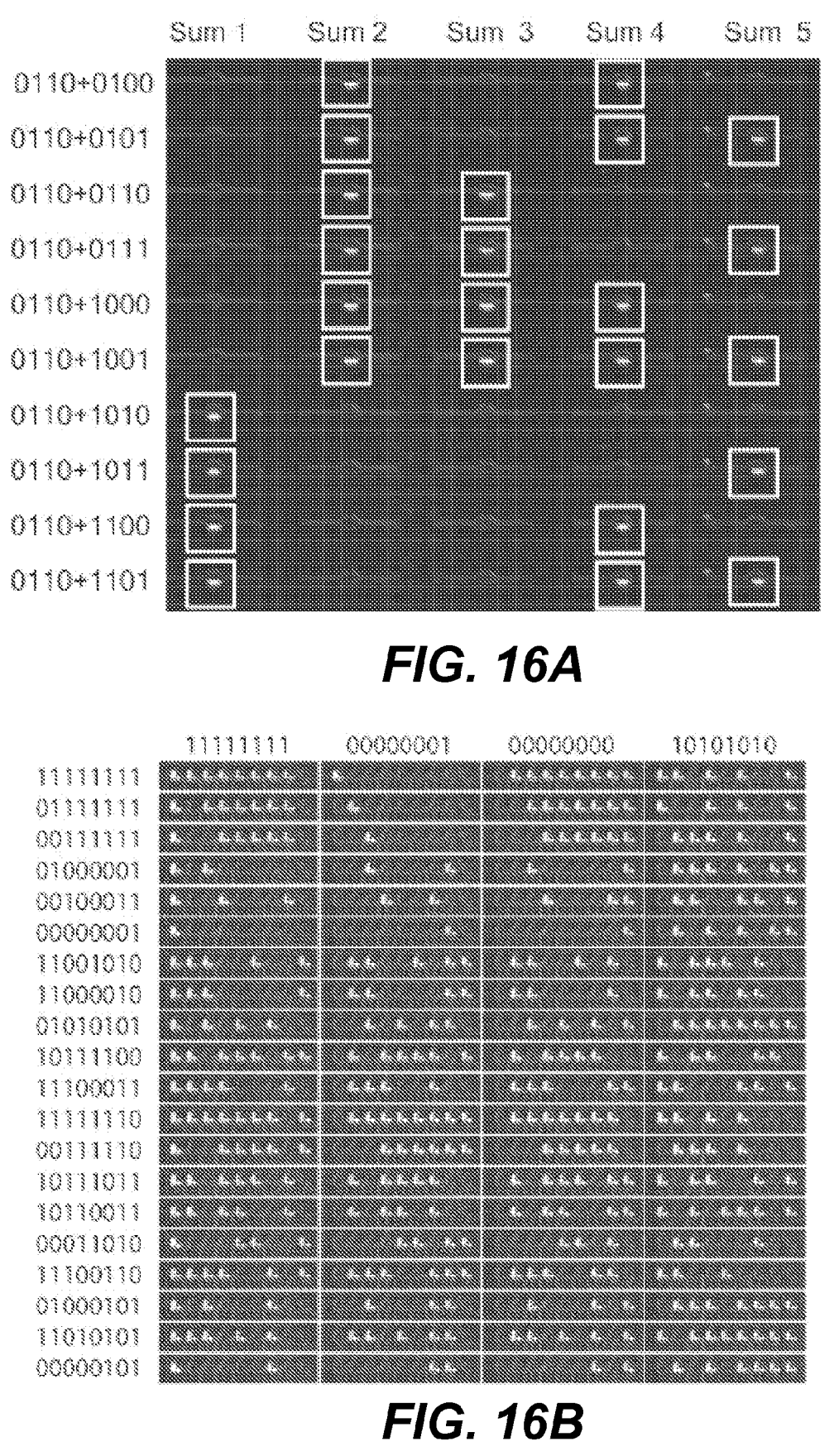

FIG. 16A shows selected outputs of the pneumatic 4-bit binary adder 130. (FIG. 14). Each row is a digital image of the output valve array taken after actuation with the indicated pattern of inputs. Open valves reflect more light and appear brighter than closed valves. Simultaneous actuation of all inputs except the X2 bus results in the automatic propagation of carry information throughout the system. The addition of 1111 and 0001 generates a carry in the least significant bit that is propagated through all of the other adders and results in the output sum, 10000. This represents a worst case scenario for the time required to compute a sum and was used to determine a reliable actuation delay for the XOR2 bus. Correct outputs were reliably obtained for each of the 256 possible pneumatic inputs configurations using a 500 ms XOR2 actuation delay.

FIG. 16B shows the output of several random inputs and worst case scenarios of carry propagation for the pneumatic 8-bit binary adder 140. (FIG. 14). The control inputs of the buffer circuit were powered by constant vacuum during the operation of the device, and a 1.1 second delay was used for the actuation of the X2 bus input. Previous designs that did not include the amplifier structure failed due to loss of signal during carry propagation. Particularly challenging cases arise when a weak carry signal must open a valve closed with a vacuum applied to its input channel. This is the case during the computation of 01111111+00000001 in which valve X2$f$ is opened in the most significant adder by a propagated carry signal.

The membrane valves function like the transistors in conventional TTL logical circuits. These pneumatic "transistors"

can be assembled into variety of basic gate structures (AND, OR, NOT, NAND, and XOR), and they can be combined to form computational circuits for binary addition. The development of an amplifying buffer circuit allows the extension of the technology to 8-bit binary adder circuits in which pneumatic signals must propagate through numerous gates. This suggests that more complex logical circuits, such as the significantly faster carry-lookahead adder, could be developed using the design principles discussed above.

Future modeling of the mechanics of individual valves and airflow through valve networks will allow precise optimization for improved response times. It has been noted that pneumatic logical devices are limited by the speed of sound in air. Although this limitation prevents any serious competition with digital electronics for computing speed, actuation frequencies in the millisecond scale are commonly used in lab-on-a-chip devices and should be attainable using micropneumatic logic. Furthermore, the miniaturization and integration of control systems may be especially useful for the development of portable MEMS devices for pathogen detection or extraterrestrial biomarker analysis.

The timing of valve actuation can be integrated using micropneumatic logical structures. As the carry propagates through a multi-bit micropneumatic adder, an automatic series of valve actuations occurs in a precise time sequence. Similarly, in digital electronics, delay circuits are often used to synchronize operational sequences in signal processing units. As noted previously, the latching behavior of networks of valves resembles the function of simple memory circuits such as flip-flops. These features could be exploited in future integrated systems that implement dynamic logical control. For situations in which latching behavior is disadvantageous, channels joining the valves in a network can be modeled as an RC circuit with a capacitance and resistance to the ground (atmospheric pressure). Smaller valves and channels would decrease the network capacitance, and nano-scale leak channels or membranes with altered gas permeability may increase airflow to the latched volumes from the atmosphere without significantly decreasing output signals during a logical operation. Such a system for reducing the latching characteristics of microvalve networks will result in improved performance and obviate the closing procedures required here.

Integrated pneumatic logic structures have proven useful for the development of valve latching structures and multiplexed control of valve arrays in complex lab-on-a-chip applications. The logic of a microfluidic device can be encoded in a membrane valve array, for example, on a chip. Inputs are provided to the membrane valve array and logically executed. This enables the membrane valve array to control a microfluidic process of an assay performed on the chip. An input to and an output from the membrane valve array may be constant or vary within time.

Further development in this area will catalyze progress toward the creation of multi-purpose, programmable microfluidic devices that can be utilized for diverse analyses. Miniaturized pneumatic logic structures may also allow integrated control in microassembly and microrobotic systems which often employ pneumatic actuation mechanisms. Furthermore, the present invention could be used to develop simple computing systems that are immune to radio frequency or pulsed electromagnetic interference. Such computing devices may also be useful in extreme environments such as those of space missions, where cosmic rays result in the malfunction or failure of electronic components.

Although certain of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using a variety of materials. Therefore, the scope of the invention should be determined with reference to the appended claims.

What is claimed is:

1. A microfluidic latching valve structure comprising:
    an input to the structure;
    first, second and third membrane valves, each valve including a valve input, a valve output, a valve control, and an elastomer membrane configured such that the application of a pressure or a vacuum to the valve control causes the membrane to deflect to modulate a flow of fluid through the valve; and
    wherein:
        (i) the input to the structure is configured to transmit pressure or vacuum to the valve input of the first membrane valve and to the valve input of the second membrane valve,
        (ii) the valve outputs of the first and second membrane valves are in communication through a microfluidic channel when the first and second membrane valves are closed, and
        (iii) the valve outputs of the first and second membranes valve are in communication with the valve control of the third membrane valve and the valve outputs of the first and second membrane valves are configured to transmit the pressure or vacuum to the valve control of the third membrane valve,
    such that a sufficient vacuum at the input to the structure causes the third membrane valve to open and upon removal of the vacuum, the third membrane valve remains open and such that a sufficient pressure at the input to the structure causes the third membrane valve to close and upon removal of the pressure, the third membrane valve remains closed.

2. The latching valve structure of claim 1 configured to control fluid flow to an on-chip, microfluidic analytical device.

3. The latching valve structure of claim 1 configured to control a fluidic process of an assay of a microfluidic device.

4. The latching valve structure of claim 1 further including a demultiplexer configured to control an array of latching valve structures in performing an assay.

5. The microfluidic latching valve structure of claim 1 wherein the input to the structure comprises first and second input channels; wherein
    the valve input of the first membrane valve is in fluid communication with the first input channel and wherein the valve control of the first membrane valve is in fluid
    the valve input of the second membrane valve is in fluid communication with the first input channel, and the valve control of the second membrane valve is in fluid communication with the second input channel;
    such that when a sufficient vacuum is applied to the first and second input channels, the third membrane valve moves to an open position and is latched in that position when the vacuum is removed; and
    such that when a sufficient pressure is applied to the first and second input channels, the third membrane valve moves to a closed position and is latched in that position when the pressure is removed.

6. The latching valve structure of claim 5 wherein the second input channel, the valve control of the first membrane valve, the valve control of the second membrane valve, and the valve input and valve output of the third membrane valve are formed in a first surface.

7. The latching valve of claim 6 wherein the first input channel, the valve input and valve output of the first membrane valve, the valve input and valve output of the second membrane valve, and the valve control of the third membrane valve are formed in a second surface opposite the first surface.

8. The latching valve structure of claim 7 wherein an elastomer membrane is located between the first and second surfaces at the area of the valve controls of the first, second and third membrane valves such that the application of a pressure or a vacuum at the first and second input channels causes the membrane to deflect to modulate a flow of a fluid through the first, second, or third membrane valve.

9. The latching valve structure of claim 5 further including: a fourth membrane valve having a valve input in fluid communication with the control of the third membrane valve, a valve output in fluid communication with the valve control of the first membrane valve, and a valve control in fluid communication with atmospheric.

10. The latching valve structure of claim 5 wherein there are a plurality of latching valve structures and further including a microfluidic demultiplexer configured to address each of the latching valve structures with either a vacuum or a pressure pulse.

11. The latching valve structure of claim 10 wherein the demultiplexer includes a plurality of rows of membrane valves configured to distribute the pressure and vacuum pulses to each of the latching valve structures.

12. The latching valve structure of claim 11 further including two pneumatic connections for each row of membrane valves of the demultiplexer.

13. The latching valve structure of claim 11 wherein the demultiplexer has n-rows of membrane valves operated by n-solenoid valves to address $2^n$ independent latching valve structures.

14. The latching valve structure of claim 11 wherein each row after the first row of membrane valves has twice the number of membrane valves of the previous row.

15. A membrane valve structure comprising:
a first input channel formed in a first surface of a first substrate;
a second input channel formed in a second surface of a second substrate;
a pressure valve having a control formed in the first surface and fluidly connected with atmospheric, and an input and output formed in the second surface wherein the input is fluidly connected to the second input channel;
a vacuum valve having a control formed in the first surface and fluidly connected to a first input channel, and input and an output formed in the second surface such that the input is fluidly connected to the second input channel;
a latching valve having an input and output formed in the first surface, and a control formed in the second surface such that the control is fluidly connected to the output of the vacuum valve; and
an elastomer membrane located between the first and second surfaces at the area of the control of each of the pressure, vacuum and latching valves such that the application of a pressure or a vacuum to the first and second input channels causes the membrane to deflect to modulate a flow of a fluid through the valves.

16. The latching valve structure of claim 5 wherein the valve input and the valve output of the third membrane valve are configured to form an input and output of the latching valve structure.

17. The latching valve structure of claim 1 wherein the valves are normally closed.

18. The latching valve structure of claim 1 wherein the input to the structure is connected to a source of vacuum or pressure.

19. The latching valve structure of claim 5 wherein the valves are normally closed.

20. The latching valve structure of claim 5 wherein the input to the structure is connected to a source of vacuum or pressure.

21. The latching valve structure of claim 1 wherein the input to the structure is configured to transmit pressure or vacuum to the valve input of the first membrane valve when the second membrane valve is closed and is configured to transmit pressure or vacuum to the valve input of the second membrane valve when the first membrane valve is closed.

* * * * *